(12) United States Patent
Tsuge

(10) Patent No.: US 11,838,710 B2
(45) Date of Patent: Dec. 5, 2023

(54) AUDIO OUTPUT DEVICE WITH LANTERN

(71) Applicant: MAKITA CORPORATION, Anjo (JP)

(72) Inventor: Kazunori Tsuge, Anjo (JP)

(73) Assignee: MAKITA CORPORATION, Anjo (JP)

( * ) Notice: Subject to any disclaimer, the term of this patent is extended or adjusted under 35 U.S.C. 154(b) by 218 days.

(21) Appl. No.: 17/509,744

(22) Filed: Oct. 25, 2021

(65) Prior Publication Data

US 2022/0141564 A1 May 5, 2022

(30) Foreign Application Priority Data

Oct. 30, 2020 (JP) ................................ 2020-182748

(51) Int. Cl.
| | |
|---|---|
| *H04R 1/02* | (2006.01) |
| *H04R 3/00* | (2006.01) |
| *F21V 23/00* | (2015.01) |
| *H04H 40/18* | (2008.01) |
| *H01Q 1/24* | (2006.01) |
| *G06F 3/16* | (2006.01) |
| *F21L 4/00* | (2006.01) |
| *F21V 23/06* | (2006.01) |

(Continued)

(52) U.S. Cl.
CPC ............. *H04R 1/028* (2013.01); *F21L 4/00* (2013.01); *F21L 19/00* (2013.01); *F21V 21/40* (2013.01); *F21V 23/06* (2013.01); *G06F 3/165* (2013.01); *H01Q 1/24* (2013.01); *H04H 40/18* (2013.01); *H01Q 9/30* (2013.01); *H02J 7/0042* (2013.01)

(58) Field of Classification Search
CPC . H04R 1/00; H04R 1/02; H04R 1/026; H04R 1/028; H04R 3/00; H04R 3/12; F21V 23/003; F21V 23/006; F21V 23/06; F21V 23/0414; F21V 21/40; F21V 21/406; F21V 33/00; F21V 33/0052; F21V 33/0056; F21L 4/00; F21L 19/00; H01Q 1/24; H01Q 9/30; G06F 3/165; H02J 7/0042; H04H 40/18
See application file for complete search history.

(56) References Cited

U.S. PATENT DOCUMENTS

| | | | |
|---|---|---|---|
| 8,235,552 B1* | 8/2012 | Tsuge | F21V 33/0056 362/253 |
| 8,428,290 B2* | 4/2013 | Cheng | H04R 1/04 381/386 |

(Continued)

FOREIGN PATENT DOCUMENTS

| | | |
|---|---|---|
| JP | S53-113021 U | 9/1978 |
| JP | 3178533 U | 9/2012 |
| JP | 2013-70504 A | 4/2013 |

*Primary Examiner* — Thang V Tran
(74) *Attorney, Agent, or Firm* — Oliff PLC

(57) ABSTRACT

An audio output device has a lantern part extends along a first axis, an antenna part, an audio output part, and a control part. The antenna part has a first end and a second end that are respectively connected to a first side and a second side relative to a central part of the lantern part in a first direction parallel to the first axis. A portion of the antenna part between the first end and the second end extends in the first direction and is spaced apart from the lantern part in a direction orthogonal to the first direction. The control part is configured to cause the audio output part to output sound corresponding to a radio broadcasting wave received by the antenna part.

17 Claims, 16 Drawing Sheets

(51) Int. Cl.
  *F21V 21/40*   (2006.01)
  *F21L 19/00*   (2006.01)
  *H02J 7/00*    (2006.01)
  *H01Q 9/30*    (2006.01)

(56) References Cited

U.S. PATENT DOCUMENTS

| | | | | |
|---|---|---|---|---|
| 10,001,251 | B2* | 6/2018 | Plott | G08B 13/189 |
| 11,671,733 | B2* | 6/2023 | Tsuge | H04R 1/26 |
| | | | | 381/332 |
| 2015/0300581 | A1* | 10/2015 | Huang | F21L 4/00 |
| | | | | 362/86 |
| 2018/0106472 | A1* | 4/2018 | Wijaya | H04R 3/00 |
| 2018/0283624 | A1* | 10/2018 | Bian | H04R 1/026 |
| 2021/0306725 | A1* | 9/2021 | Tsuge | H04R 1/2811 |

* cited by examiner

[FIG.1]
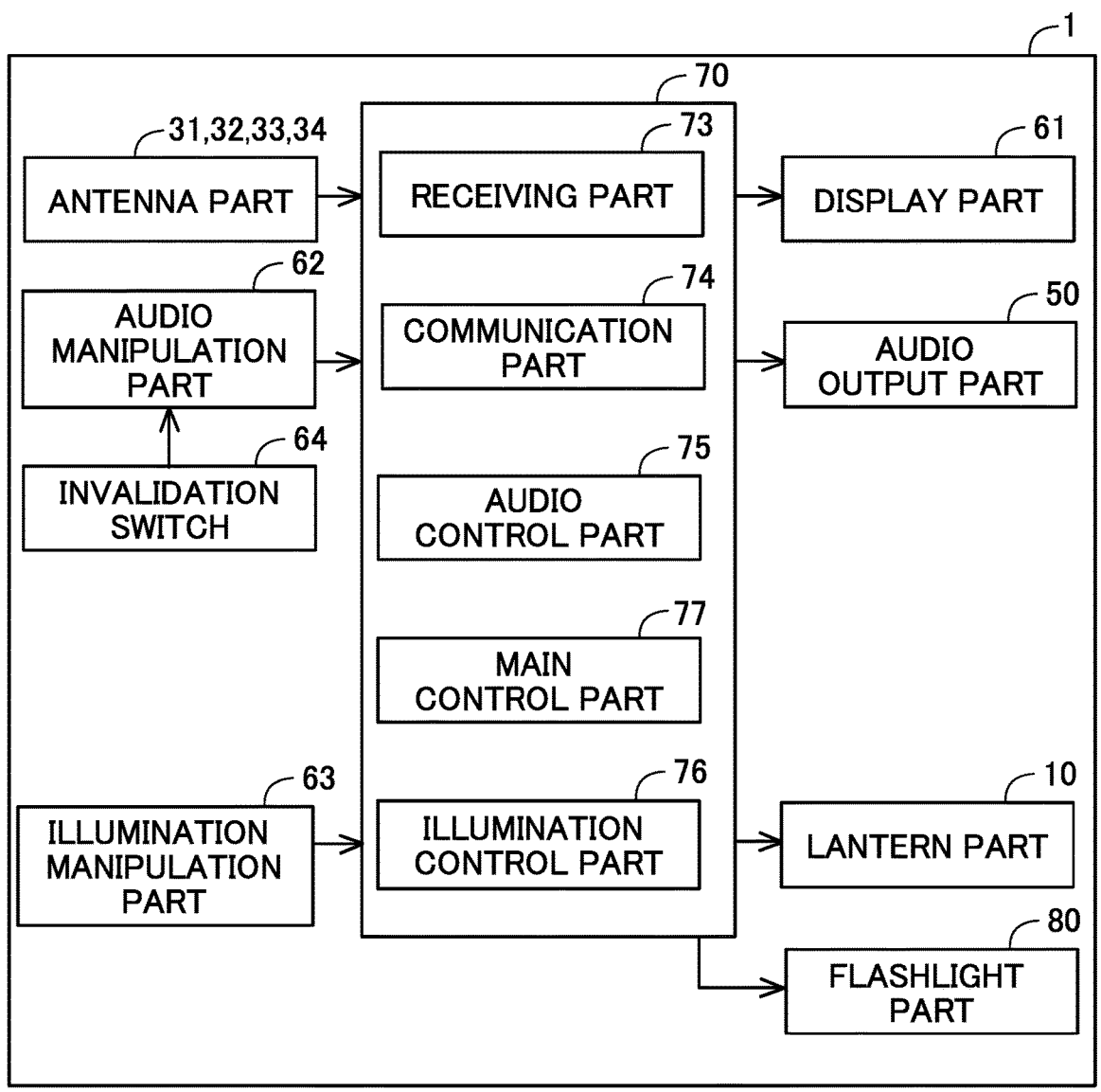

[FIG.2]
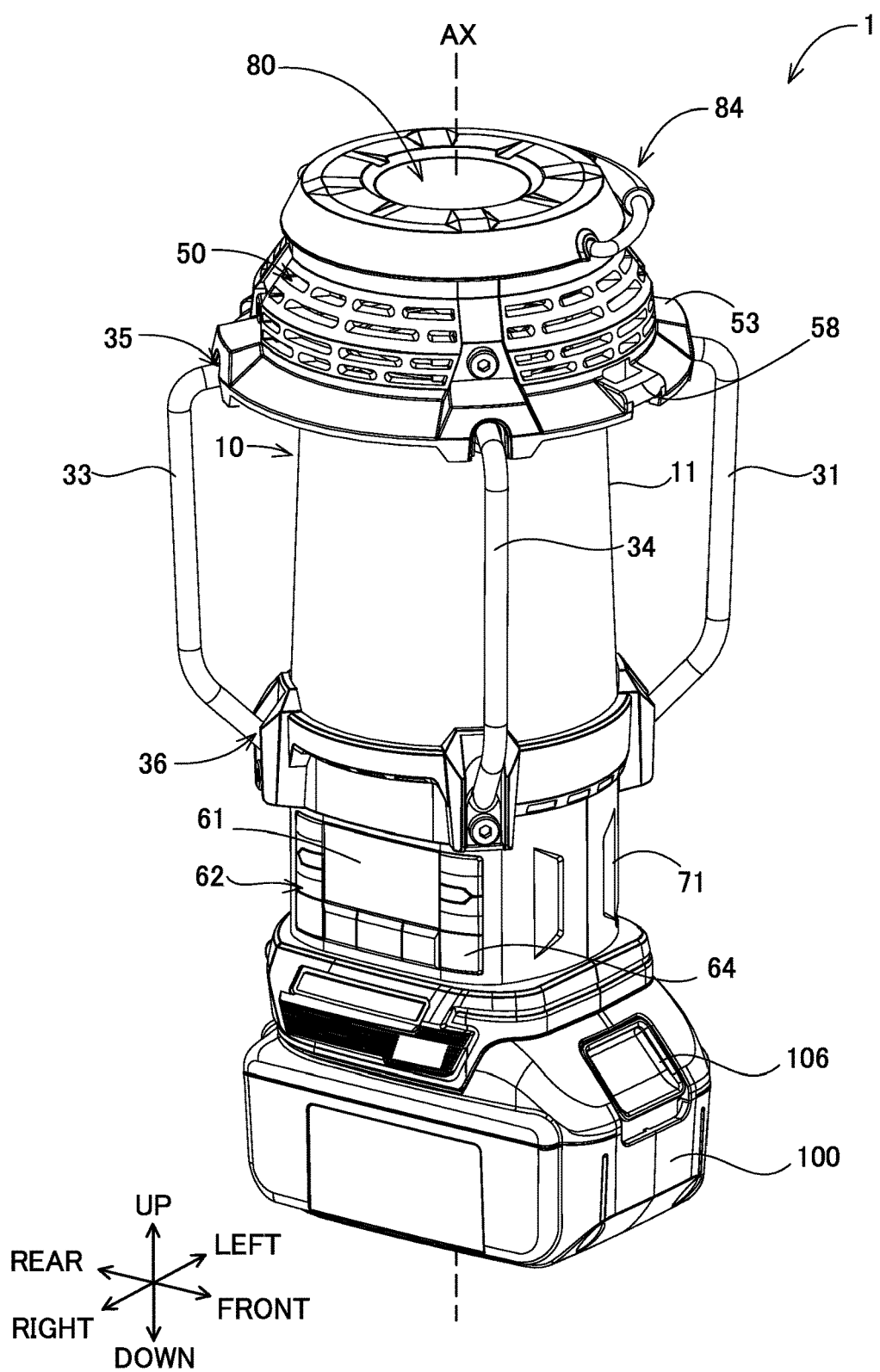

[FIG.3]
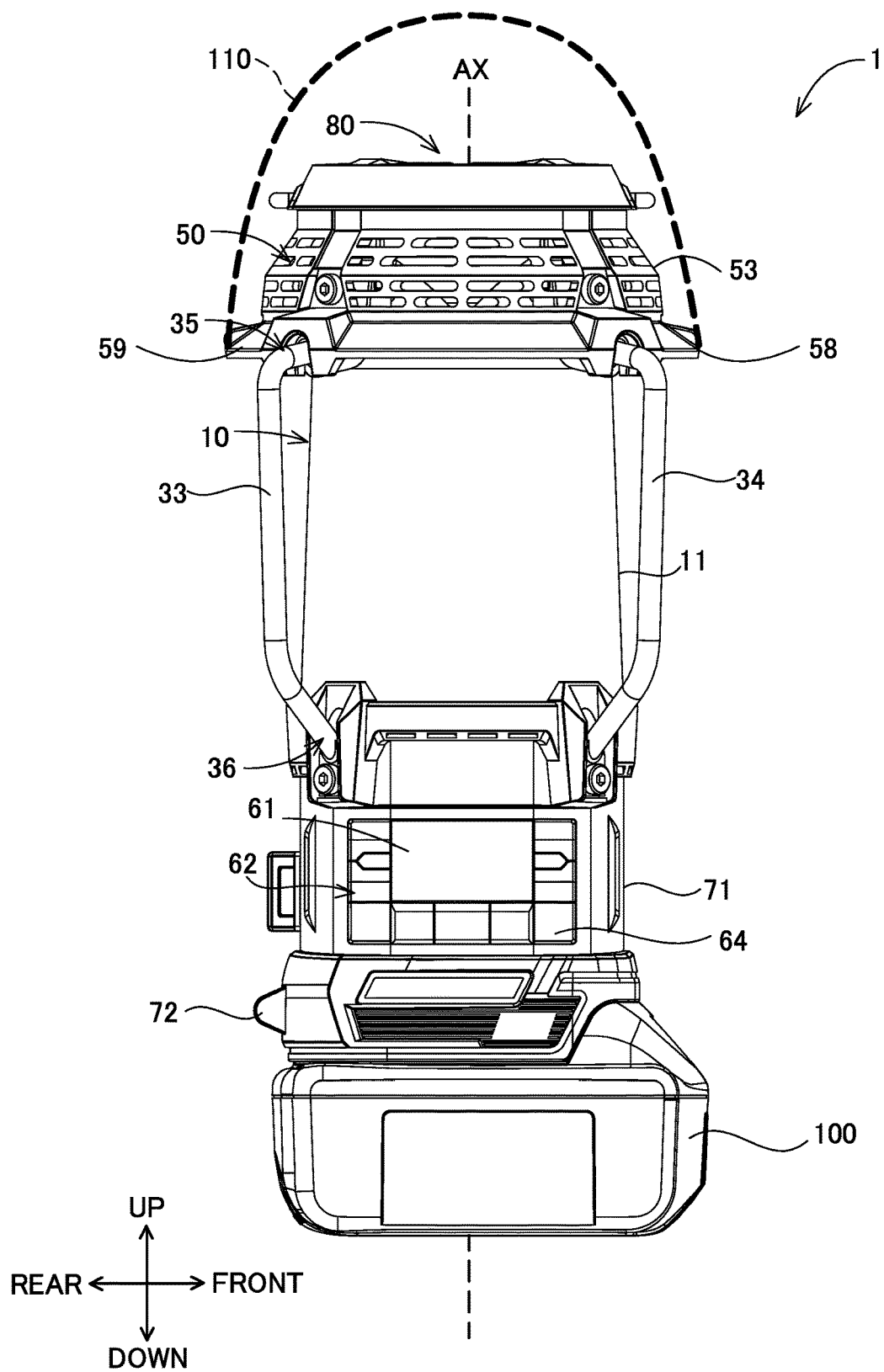

【FIG.4】
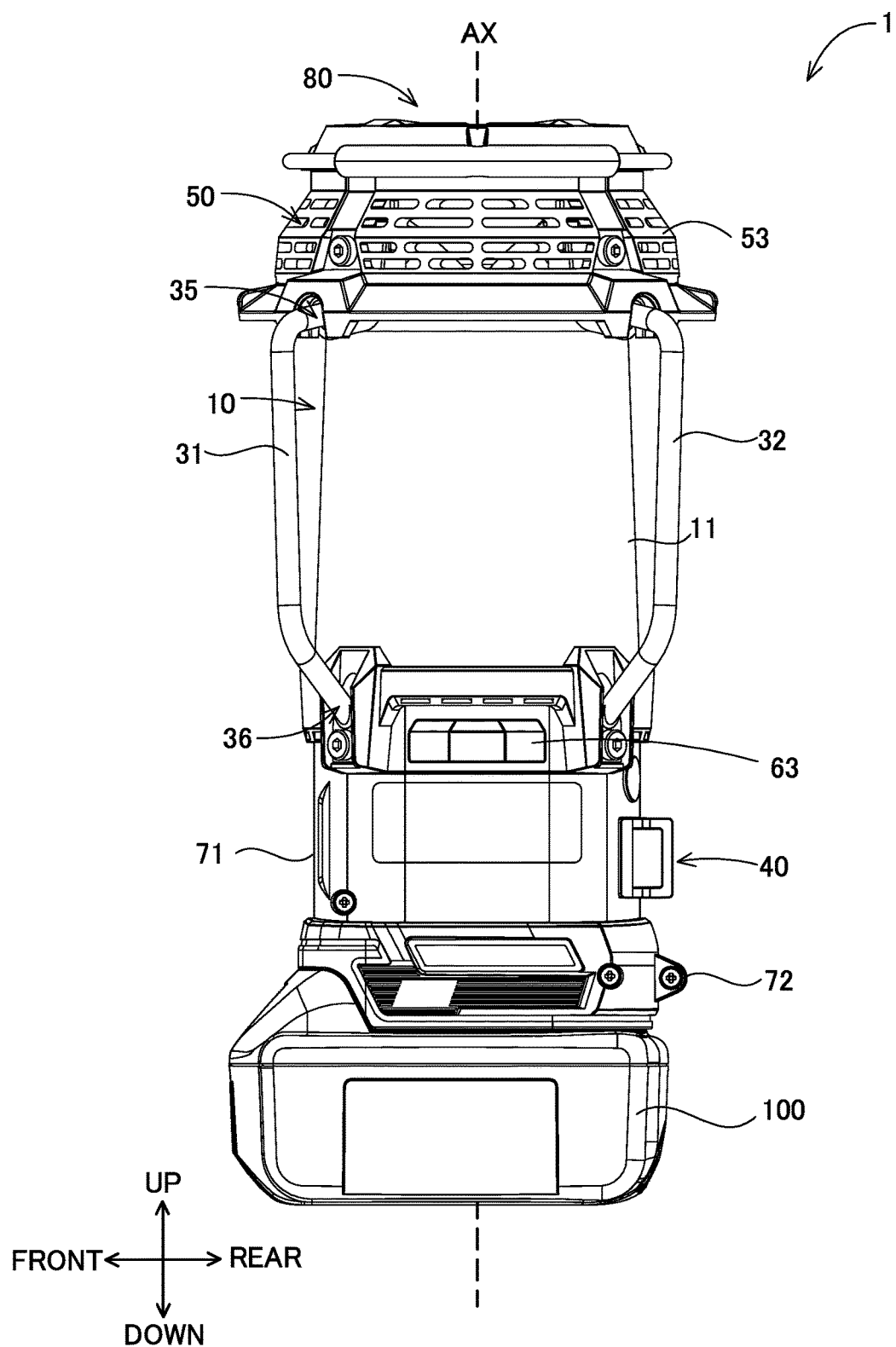

[FIG.5]
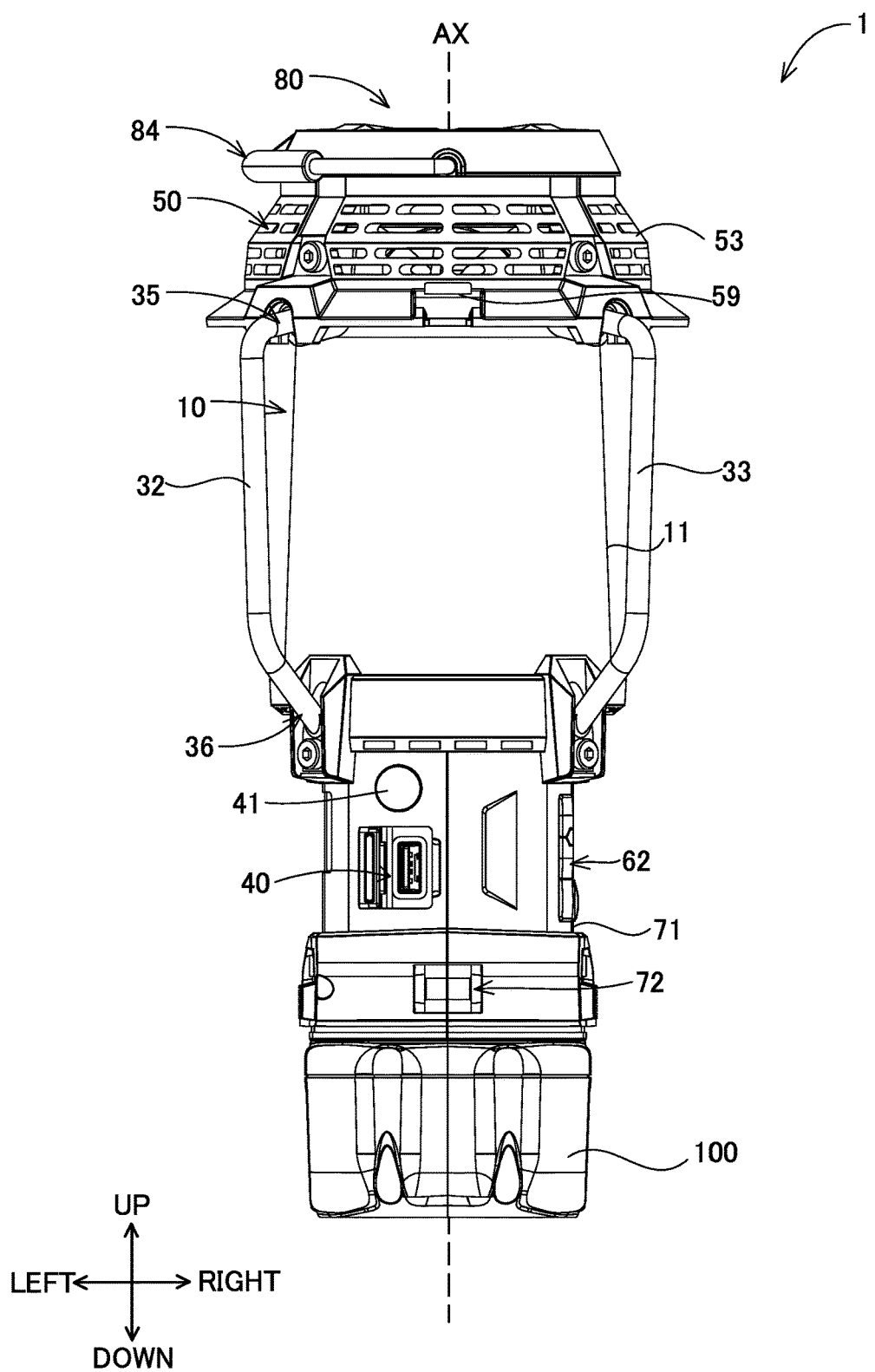

【FIG.6】
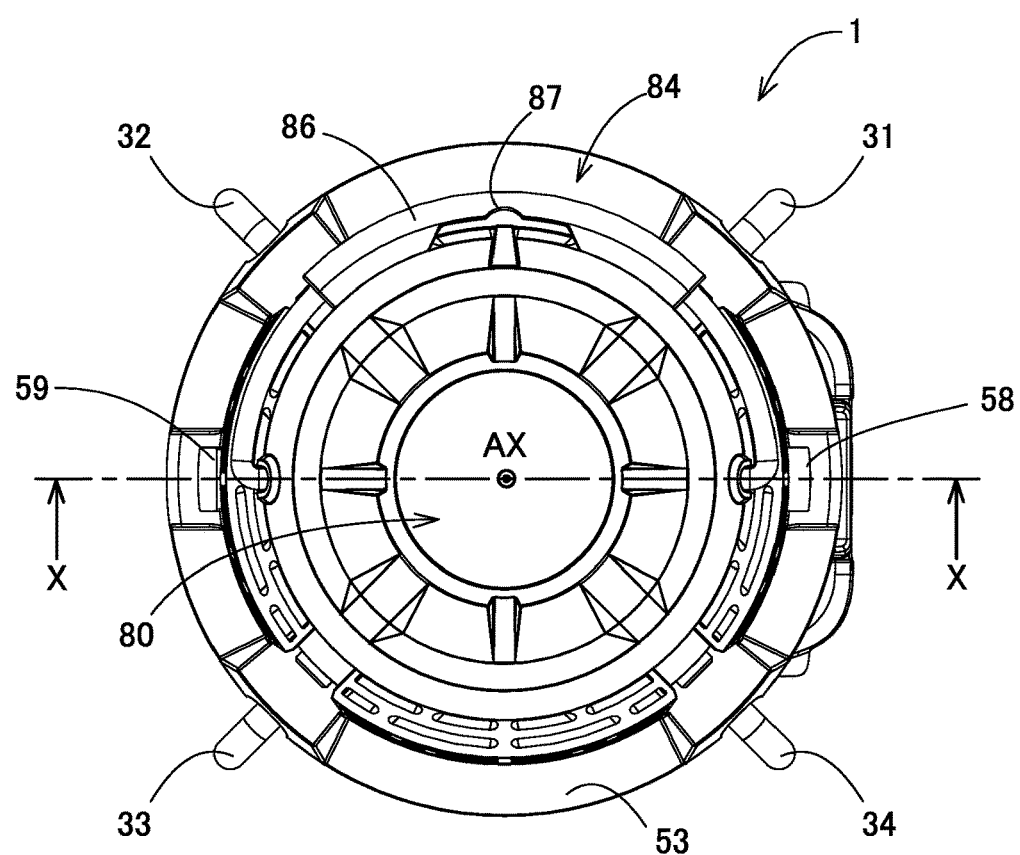
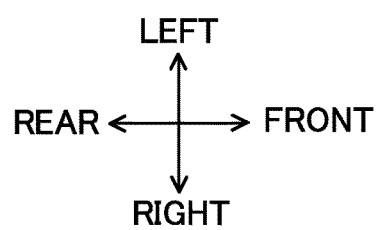

[FIG.7]
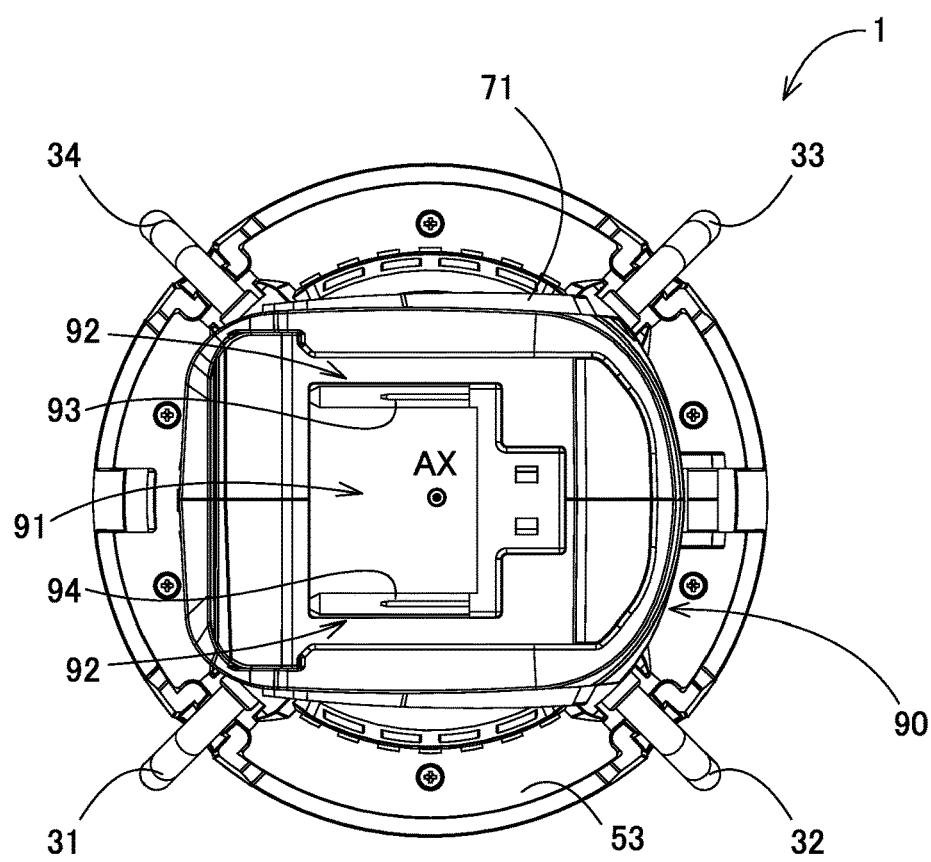
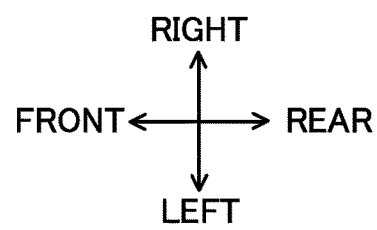

[FIG.8]
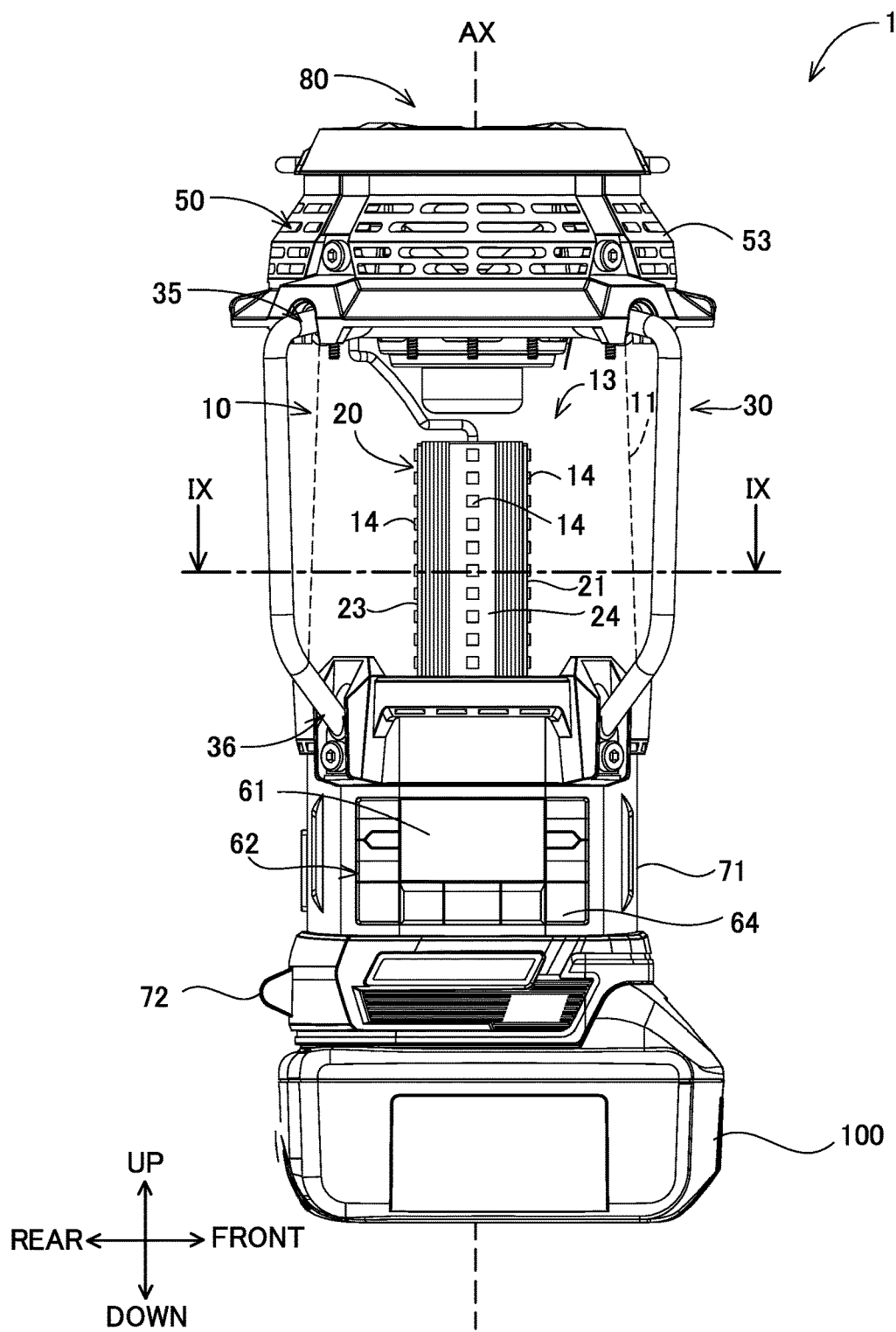

[FIG.9]
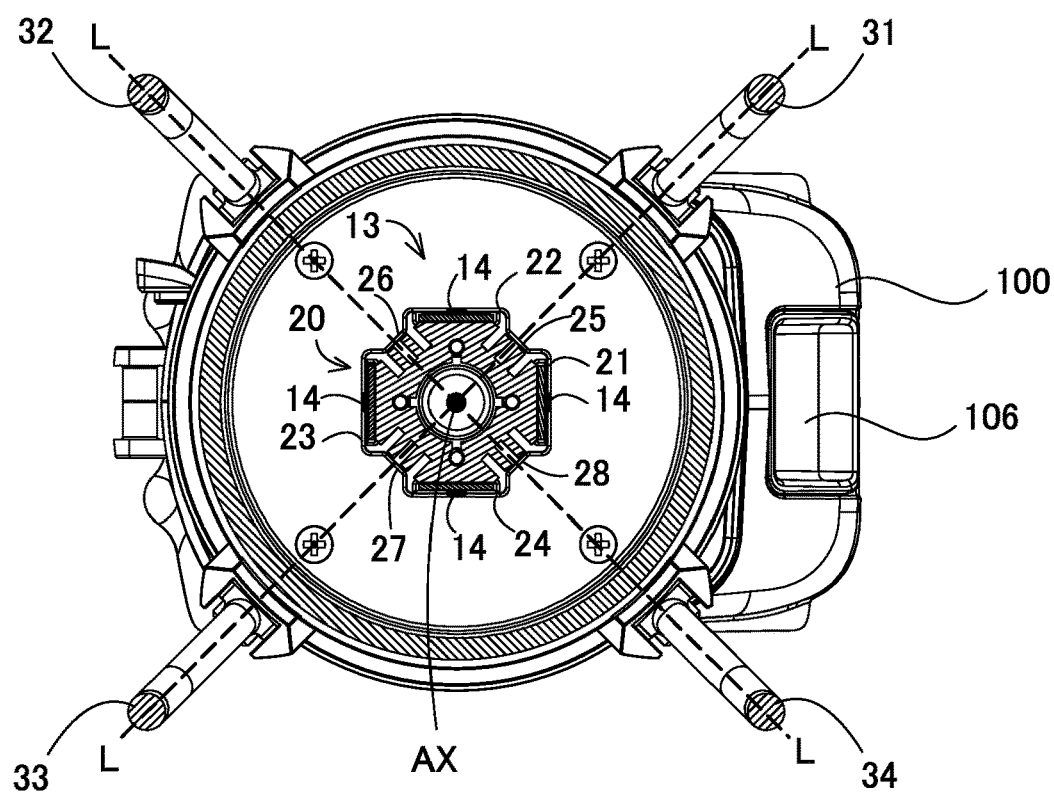
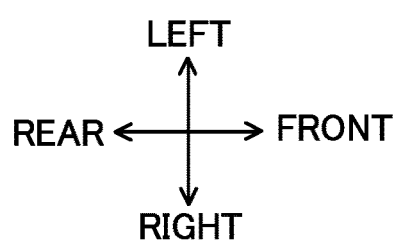

[FIG.10]
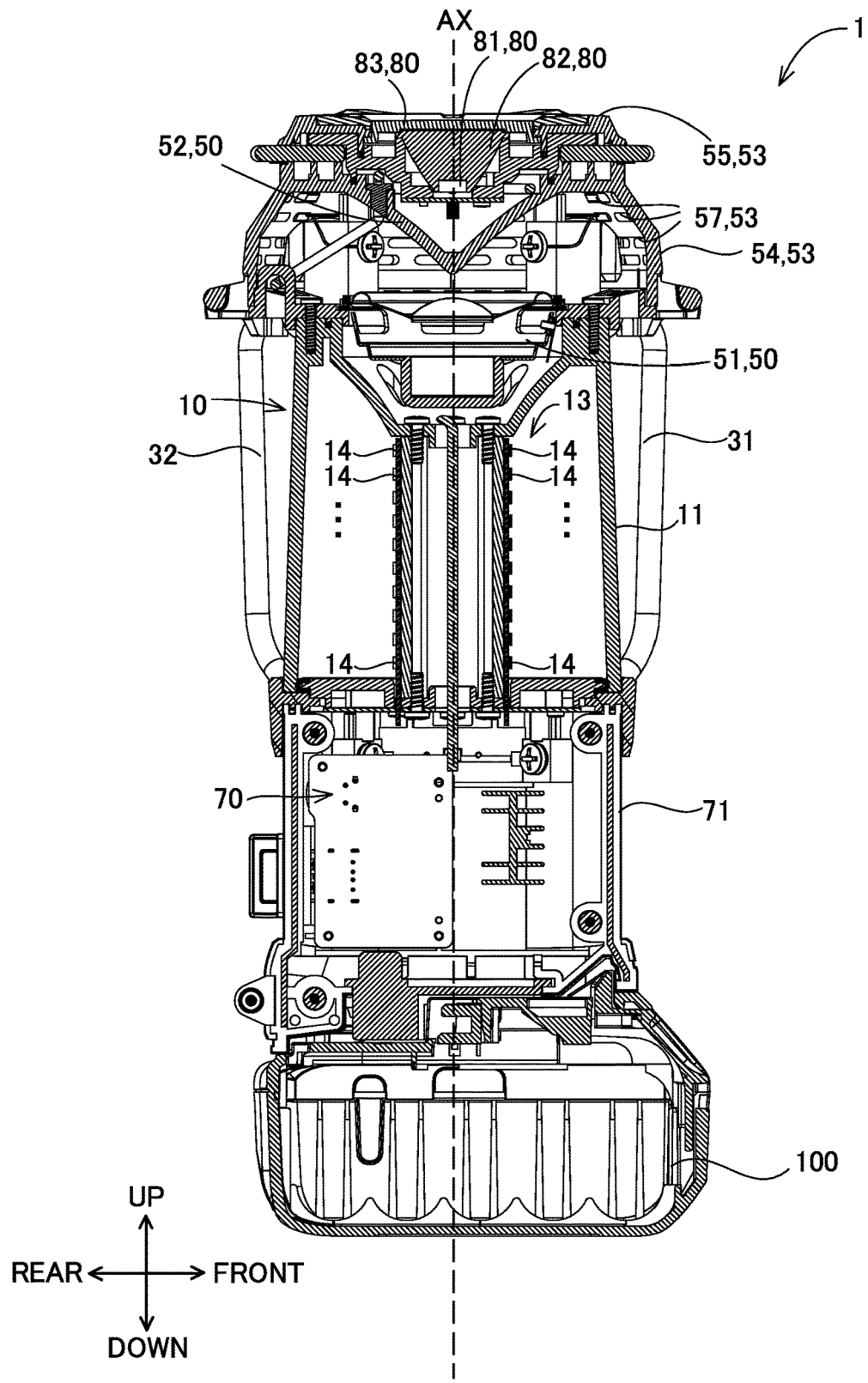

[FIG.11]
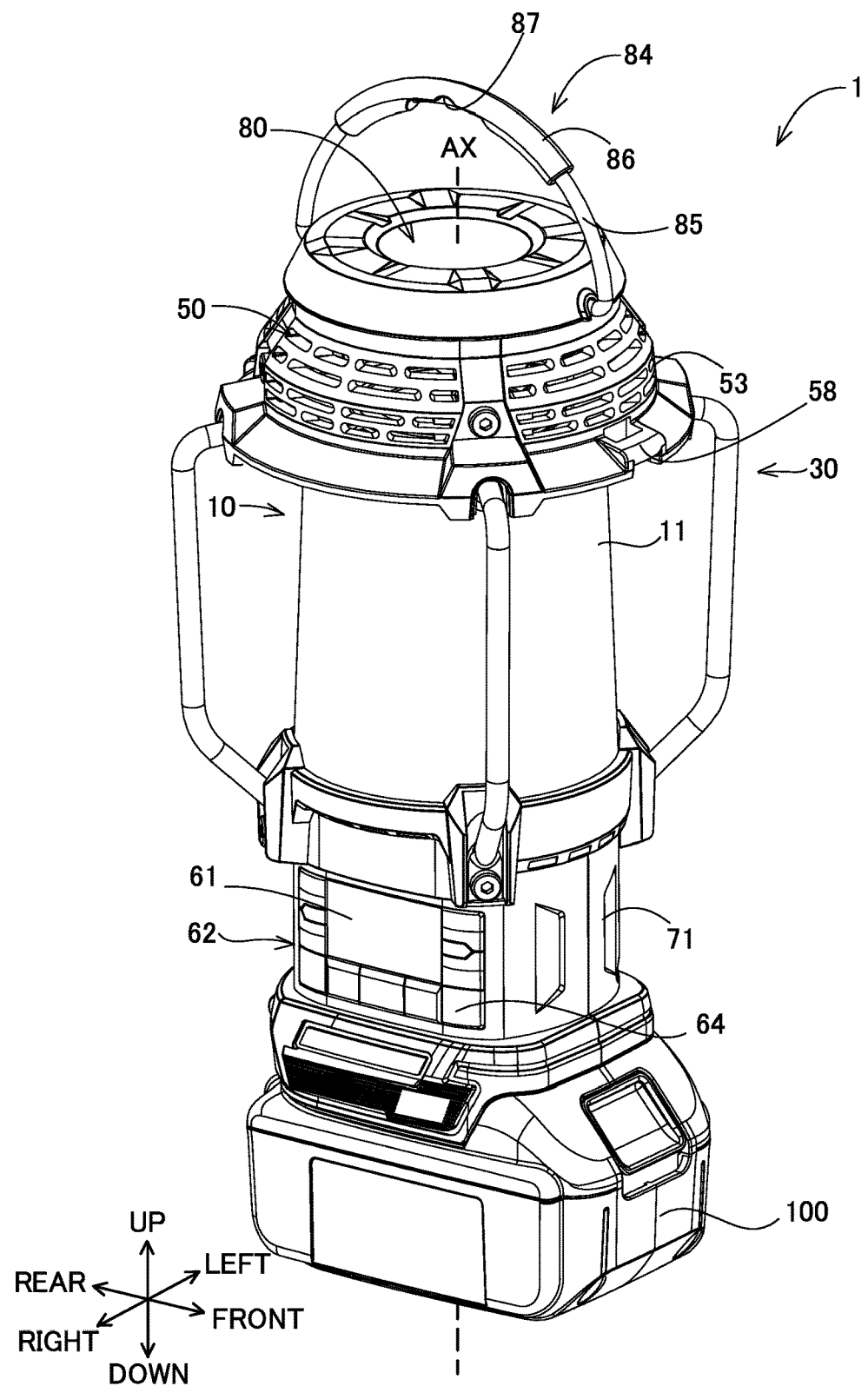

[FIG.12]
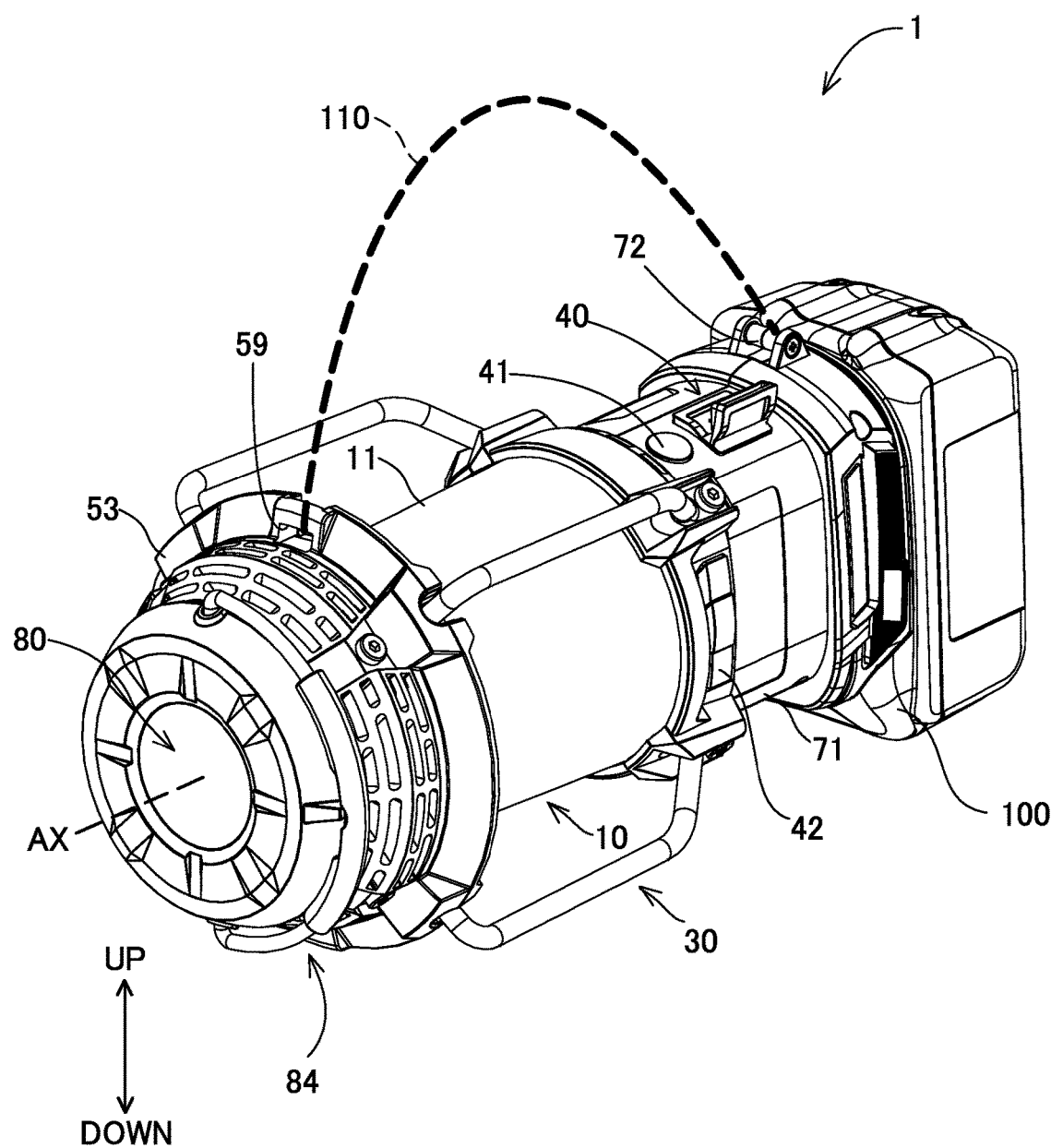

[FIG.13]
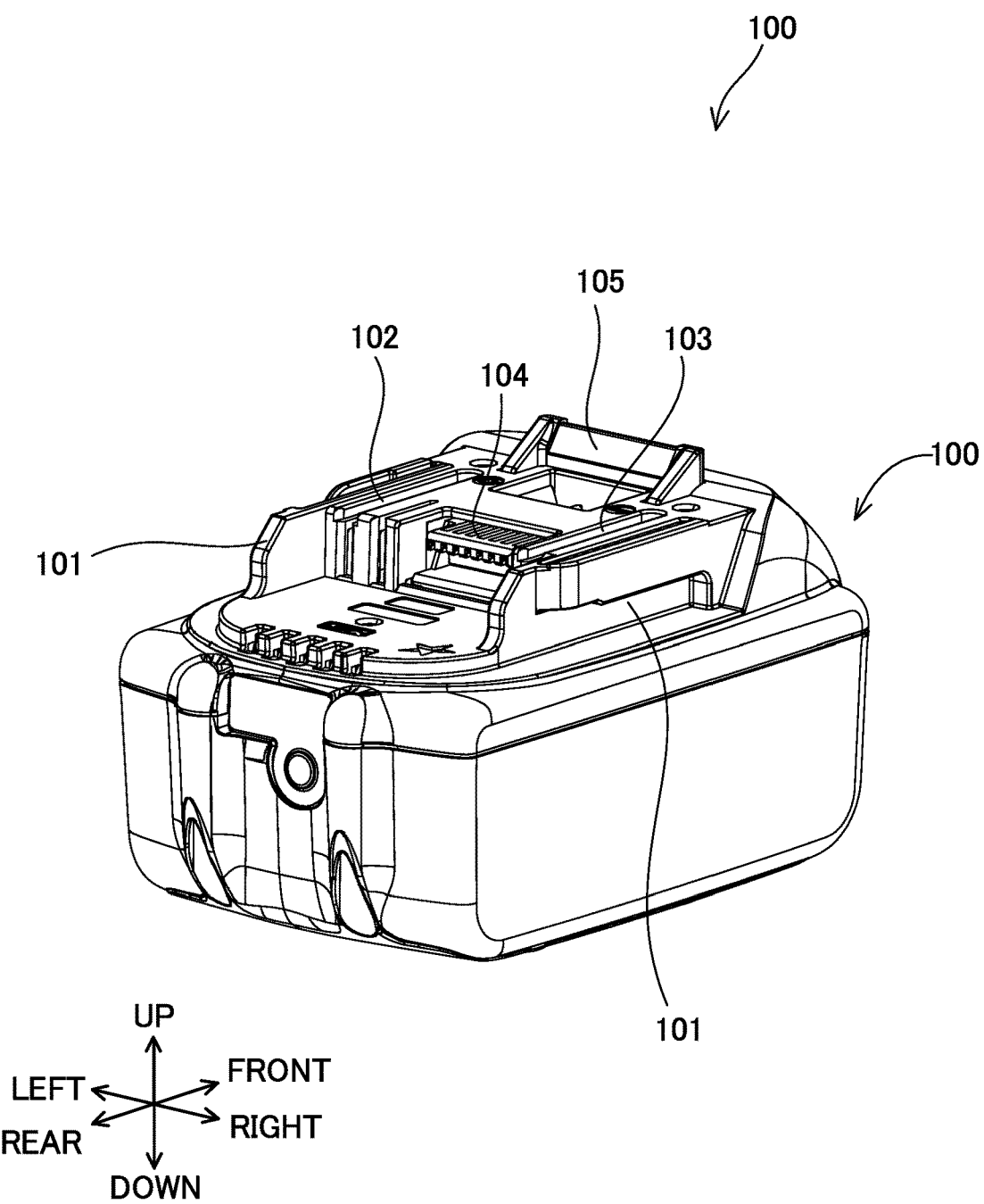

[FIG.14]
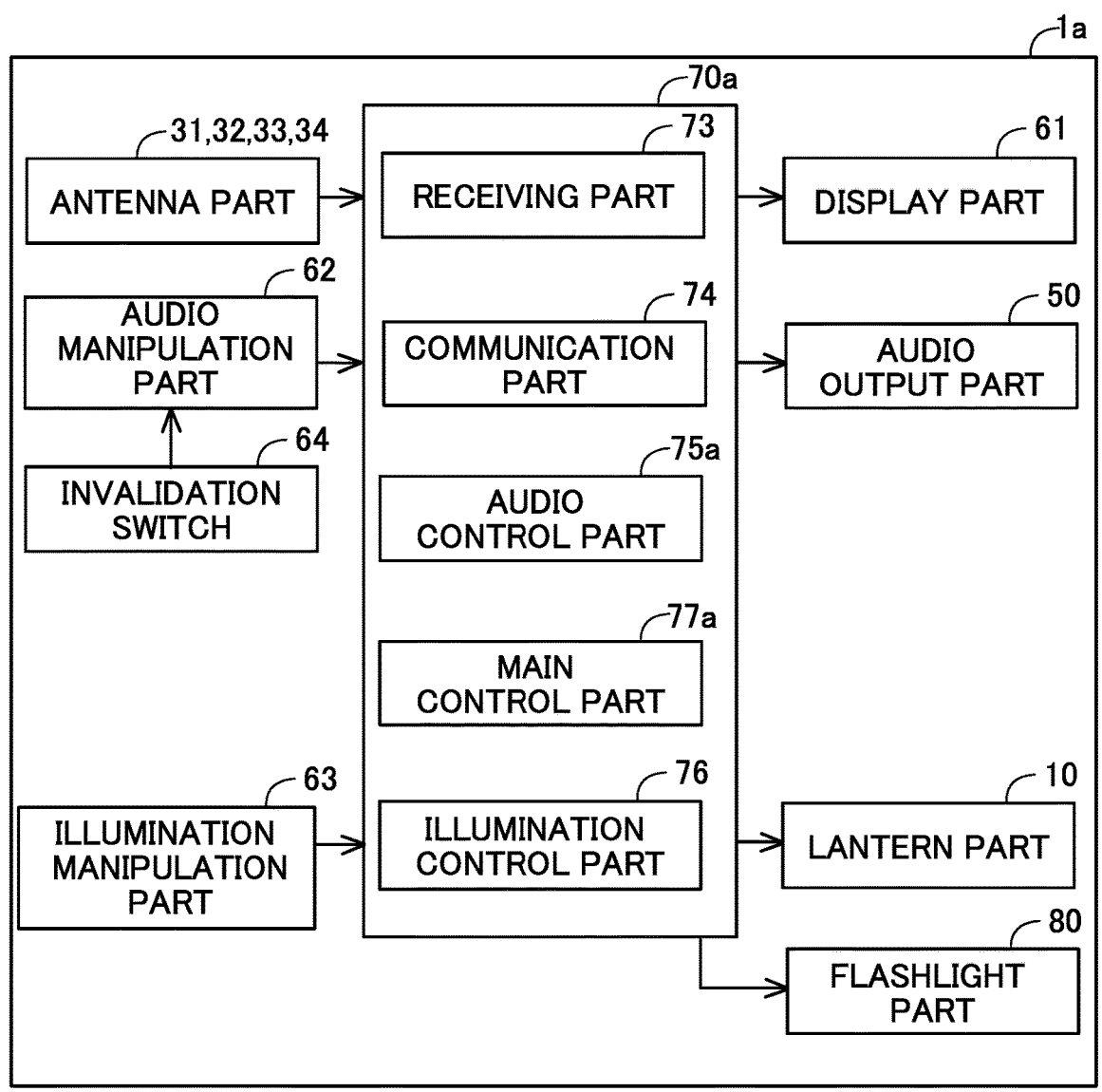

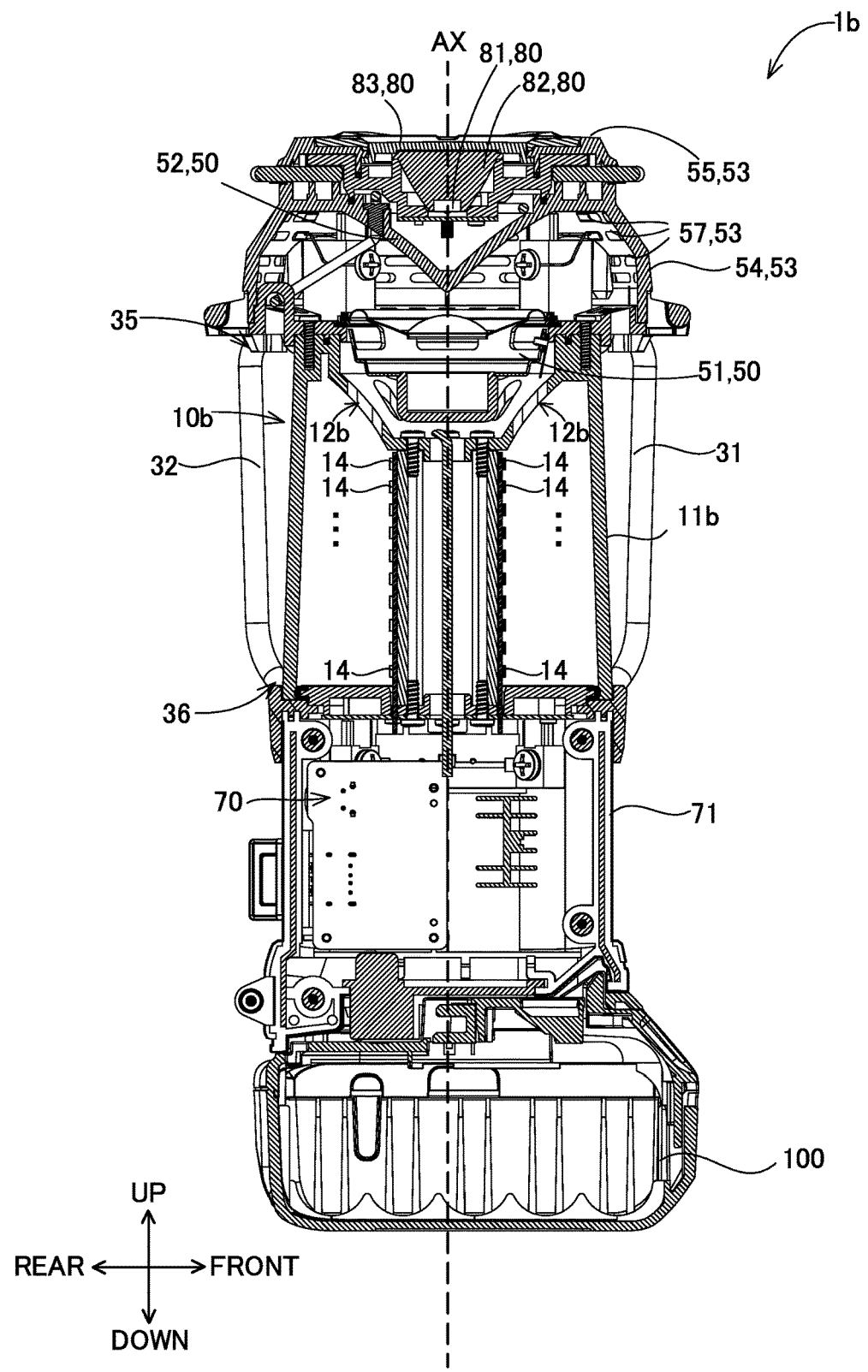
[FIG.15]

[FIG.16]
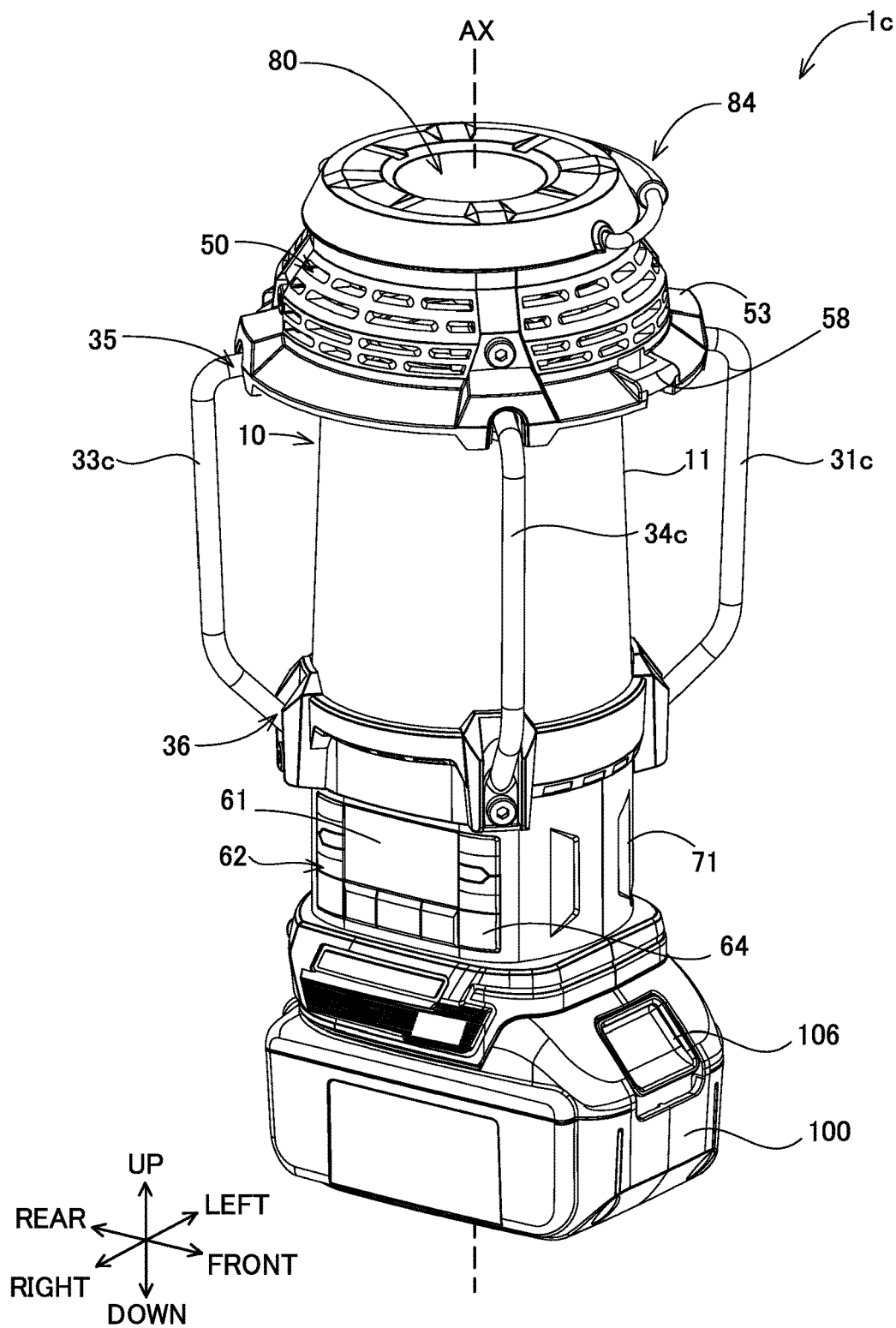

AUDIO OUTPUT DEVICE WITH LANTERN

CROSS REFERENCE TO RELATED ART

The present application claims priority to Japanese Patent Application No. 2020-182748 filed on Oct. 30, 2020, the disclosure of which is hereby incorporated by reference in its entirety.

TECHNICAL FIELD

The present disclosure relates to an audio output device with a lantern part.

BACKGROUND

Japanese Unexamined Patent Application Publication No. 2013-70504 discloses a radio with a light, having functions of a light and a radio. About a lower half of this radio with a light is a radio part having an audio output part, and about an upper half is an illumination part. The illumination part is connected to a body so as to be able to change the illumination direction in an up-down direction. Recently, however, it has been desired to provide a novel device having a function as a lantern for illuminating the surroundings and a function of outputting sound, for example, in camping or during a disaster.

SUMMARY

According to a first aspect of the present disclosure, an audio output device is provided. The audio output device is configured to be driven by power supplied from an external power source. The audio output device (apparatus) has a lantern part, an antenna part, an audio output part and a control part. The lantern part extends along a first axis and is configured to irradiate light in a direction crossing the first axis. The antenna part is configured to receive radio broadcasting waves. The audio output part is configured to output sound. The control part is configured to control light irradiation of the lantern part and audio output of the audio output part. The antenna part has a first end and a second that are respectively connected to a first side and a second side relative to a central part of the lantern part in a first direction parallel to the first axis. The antenna part has a portion being disposed between the first end and the second end. The portion extends in the first direction. The portion is spaced apart from the lantern part in a direction orthogonal to the first axis. The control part is configured to cause the audio output part to output sound corresponding to a radio broadcasting wave received by the antenna part.

According to this aspect, the antenna part provides a function of protecting the lantern part against external impact in addition to a function as an antenna for receiving radio broadcasting waves. Thus, the audio output device is provided having both a function as a lantern for illuminating the surroundings and an audio outputting function.

According to a second aspect of the present disclosure, an audio output device is provided. The audio output device has a lantern part, a protection member, an audio output part, a control part and a mounting unit. The lantern part extends along a first axis and is configured to irradiate light in a direction crossing the first axis. The protection member is configured to protect the lantern part. Where a first direction parallel to the first axis is defined as the up-down direction of the audio output device, an upper end of the protection member is connected to an upper side relative to a central part of the lantern part in the up-down direction, and a lower end of the protection member is connected to a lower side relative to the central part of the lantern part. A portion of the protection member between the upper end and the lower end extends in the up-down direction and is spaced apart from the lantern part in a direction orthogonal to the first axis. The audio output part is arranged above the lantern part and configured to output sound. The control part is arranged below the lantern part and configured to control light irradiation from the lantern part and audio output from the audio output part. The mounting unit is arranged below the control part and configured such that a battery pack for supplying power to the audio output device can be removably coupled thereto.

According to this aspect, the protection member protects the lantern part against external impact. Further, in the audio output device, the mounting unit, the control part, the lantern part and the audio output part are arranged in this order from the bottom to top. Thus, when the battery pack is coupled to the mounting unit, the relatively heavy battery pack is arranged on the bottom, so that the audio output device is improved in stability when located in place. Further, the audio output part is arranged on the top, so that sound carries better to the surroundings than with a structure in which the audio output part is arranged below the control part and the lantern part.

BRIEF DESCRIPTION OF THE DRAWINGS

FIG. 1 is a block diagram showing an audio output device according to a first embodiment.

FIG. 2 is a perspective view of the audio output device.

FIG. 3 is a right side view of the audio output device.

FIG. 4 is a left side view of the audio output device.

FIG. 5 is a back view of the audio output device.

FIG. 6 is a top view of the audio output device.

FIG. 7 is a bottom view of the audio output device.

FIG. 8 shows a light irradiation device inside of a cover.

FIG. 9 is a sectional view taken along line IX-IX in FIG. 8.

FIG. 10 is a sectional view taken along line X-X in FIG. 6.

FIG. 11 shows the audio output device, with a handle in an upright position.

FIG. 12 shows an example of an attitude of the audio output device in use.

FIG. 13 shows a battery pack as an example of an external power source.

FIG. 14 is a block diagram showing an audio output device according to a second embodiment.

FIG. 15 is a sectional view showing an audio output device according to a third embodiment.

FIG. 16 is a perspective view showing an audio output device according to a fourth embodiment.

DETAILED DESCRIPTION OF THE EMBODIMENTS

In one non-limiting embodiment of the present disclosure, the first direction may define an up-down direction of the audio output device, the audio output part may be arranged above the lantern part, and the control part may be arranged below the lantern part.

According to this embodiment, the control part, the lantern part and the audio output part are arranged in this order from the bottom to the top. Thus, sound carries better to the surroundings than with a structure in which the audio output part is arranged below the control part and the lantern part.

In addition or in the alternative to the preceding embodiment, the audio output device may further have a flashlight (spotlight) part. The flashlight part may be arranged above the audio output part.

According to this embodiment, the flashlight part arranged above the audio output part can be used to illuminate in a prescribed direction.

In addition or in the alternative to the preceding embodiments, the audio output device may further have a first housing, a manipulation part and a switch. The first housing may be configured to house the control part and may be configured such that a user can hold an outer periphery (outer peripheral surface) of the first housing. The manipulation part may be provided on the outer periphery of the first housing and configured to be manually operated by the user for setting the output of the audio output part. The switch may be configured to invalidate the output set by the user via the manipulation part.

According to this embodiment, the first housing provides a function as a grip part when the flashlight part is used. Thus, the audio output device is improved in design as compared with a structure in which a grip part for the flashlight part is separately provided. Further, the possibility that the user accidentally manipulates the manipulation part when holding the outer periphery (outer peripheral surface) of the first housing can be reduced by turning on the switch, so that the audio output device is improved in usability.

In addition or in the alternative to the preceding embodiments, the audio output device may further have a second housing and a handle. The second housing may be configured to house the audio output part. The handle may be connected to the second housing to extend upward from the second housing. The handle may be having a first end and a second end that is respectively connected to the second housing.

According to this embodiment, a user can hold the handle to carry the audio output device, or hang the handle from a hook or the like when using the audio output device. Thus, the audio output device is improved in convenience.

In addition or in the alternative to the preceding embodiments, the audio output device may further have a second housing. The second housing may be configured to house the audio output part. The lantern part may have a light source and a tubular cover part. The cover part is configured to extend in the first direction and within which the light source is housed. The cover part may be arranged adjacent to the second housing in the first direction. The second housing and the cover part may be configured such that an internal space of the cover part communicates with an internal space of the second housing.

According to this embodiment, sound outputted from the audio output part can be resonated inside the cover part. Thus, the cover part provides a function of resonating sound outputted from the audio output part in addition to the function of protecting the light source.

In addition or in the alternative to the preceding embodiments, the lantern part may have a light irradiation device having a plurality of light sources. The antenna part may be arranged such that a straight line orthogonal to the first axis and intersecting the antenna part does not extend through (intersect) the light sources. In other words, the antenna part may be arranged in a position that does not overlap with the light sources when viewed in a direction orthogonal to the first direction from the first axis of the lantern part.

According to this embodiment, the possibility that light irradiated from the lantern part is intercepted (blocked) by the antenna part can be reduced.

In addition or in the alternative to the preceding embodiments, the audio output device may further have a USB (universal serial bus) terminal part. The USB terminal part may be configured to be connectable with an external device. The USB terminal part may be configured at least either (i) to charge the connected external device with power of the external power source, or (ii) to drive the connected external device by using power of the external power source.

According to this embodiment, the audio output device is configured at least either to charge the external device, or to drive the external device, via the USB terminal part.

In addition or in the alternative to the preceding embodiments, the control part may be configured to selectively output from the audio output part sound corresponding to an AM (amplitude modulation) radio wave. The control part may further be configured not to output from the audio output part sound corresponding to the AM radio wave when the external device is connected to the USB terminal part.

According to this embodiment, noise that may be caused by simultaneously using the USB terminal part and an AM radio is not outputted from the audio output part, so that the usability is further improved.

In addition or in the alternative to the preceding embodiments, the control part may be configured to selectively output from the audio output part sound corresponding to the AM radio wave and sound corresponding to an FM (frequency modulation) radio wave. The control part may further be configured to output from the audio output part sound corresponding to the FM radio wave instead of sound corresponding to the AM radio wave when the external device is connected to the USB terminal part while the sound corresponding to the AM radio wave is outputted from the audio output part.

According to this embodiment, noise that may be caused by simultaneously using the USB terminal part and an AM radio is not outputted, and the radio sound is continued to be outputted, so that the usability is further improved.

In addition or in the alternative to the preceding embodiments, the audio output device may further have a mounting unit and a display part. The mounting unit may be configured such that a battery pack as the external power source can be removably coupled thereto. The display part may be configured to display drive information of the audio output device. The display part may have a backlight. The control part may be configured to flicker the backlight of the display part when the residual capacity of the battery pack coupled to the mounting unit is not more than a predetermined capacity.

According to this embodiment, the user can be alerted that the residual capacity of the battery pack is not more than a predetermined capacity.

In addition or in the alternative to the preceding embodiments, the audio output device may further have a mounting unit. The mounting unit may be configured such that a battery pack as the external power source can be removably coupled thereto. Where the first direction defines an up-down direction of the audio output device, the lantern part may be arranged above the control part, and the mounting unit may be arranged below the control part.

According to this embodiment, in the audio output device, the mounting unit, the control part and the lantern part are arranged in this order from the bottom to the top. Thus, when the battery pack is coupled to the mounting unit, the relatively heavy battery pack is arranged on the bottom, so that the audio output device is improved in stability when located in place.

Representative and non-limiting embodiments of the present disclosure are now specifically described with reference to the drawings.

First Embodiment

An audio output device having a lantern part 1 (hereinafter simply referred to as an "audio output device 1") according to a first embodiment of the present disclosure is described with reference to FIGS. 1 to 13. The audio output device 1 provides a function of a lantern and an audio outputting function. The audio output device 1 can also be called a lantern device (apparatus) 1. The "lantern" is a kind of an illumination device for illuminating the space around (surrounding) the audio output device 1. The audio output device 1 is configured to be driven by power supplied from an external power source. FIGS. 2 to 6 and 8 to 10 show the audio output device 1 having a battery pack 100 coupled thereto as an example of the external power source.

The audio output device 1 mainly includes a lantern part 10, antenna parts (antennas) 31 to 34, an audio output part 50 and a control part 70. The lantern part 10 has an elongate shape and extends in a direction of an axis AX (hereinafter also referred to as an "axial direction"). The audio output part 50 is arranged on one side (first side) relative to a central part of the lantern part 10 in the axial direction, and the control part 70 is arranged on the other side (second side) relative to the central part of the lantern part 10. The control part 70 is housed within a first housing 71. A display part 61 for displaying drive information of the audio output device 1 is provided on an outer peripheral surface of the first housing 71. The audio output device 1 of this embodiment further has a handle 84, a flashlight part 80, an audio manipulation part 62, an illumination manipulation part 63, an invalidation switch 64, a mounting unit 90 and a USB (universal serial bus) terminal part (output terminal part) 40.

In the following description, for convenience sake, the vertical direction is defined as an up-down direction. In FIGS. 2 to 11, the axial direction corresponds to the up-down direction. The audio output part 50 is arranged on an upper side of the lantern part 10, and the control part 70 is arranged on a lower side of the lantern part 10. In FIGS. 2 to 11, an extension direction of the axis that is orthogonal to the axis AX and that intersects (extends through) the display part 61 and the first housing 71 is defined as a left-right direction. In the left-right direction, the side on which the display part 61 is arranged relative to the first housing 71 is defined as a right side, and the opposite side is defined as a left side. Further, a direction orthogonal to the axis AX (the up-down direction) and the left-right direction is defined as a front-rear direction. Parts or components of the audio output device 1 are now described.

The lantern part 10 is configured to irradiate light to the surroundings of the lantern part 10. In other words, the lantern part 10 is configured to irradiate light to the space around the lantern part 10. In this embodiment, the lantern part 10 has a cover 11 and a light irradiation device 13 (see FIGS. 8 to 10).

The cover 11 is a generally tubular member extending in the axial direction (the up-down direction). The cover 11 is formed to transmit light. For example, the cover 11 can be formed of light diffusing plastic. In this embodiment, as shown in FIG. 10, an upper wall of the cover 11 is recessed downward. The antenna parts 31 to 34 are arranged radially outside of the cover 11.

The light irradiation device 13 is a kind of an elongate illumination device having a longitudinal axis (the axis AX). The light irradiation device 13 is arranged radially inside of the cover 11. The light irradiation device 13 has a base part 20 extending in the axial direction and a plurality of light sources 14 arranged on the base part 20. In this embodiment, as shown in FIG. 9, the base part 20 has a polygonal cross section orthogonal to the axial direction. Specifically, the base part 20 has a front surface part 21, a left surface part 22, a rear surface part 23 and a right surface part 24, and further has connecting surface parts 25, 26, 27, 28. The connecting surface parts 25, 26, 27, 28 respectively connect between the front surface part 21 and the left surface part 22, between the left surface part 22 and the rear surface part 23, between the rear surface part 23 and the right surface part 24 and between the right surface part 24 and the front surface part 21. The connecting surface parts 25 to 28 face the antenna parts 31 to 34 in cross sectional view, while the above-described surface parts 21 to 24 do not face the antenna parts 31 to 34 in cross sectional view (see FIG. 9).

The light sources 14 are arranged on the surface parts 21 to 24. In this embodiment, the light sources 14 are LEDs. The light sources 14 include a plurality of white (fluorescent light color) LEDs and a plurality of warm colored (bulb color, incandescent bulb color) LEDs. The plurality of white LEDs and a plurality of warm colored LEDs are alternately arranged in the axial direction (the up-down direction) each of the surface parts 21 to 24. A cable is inserted through the base part 20 radially inside of the base part 20). The cable includes a cable, for example, for supplying power to the light sources 14 from the external power source. The light irradiation device 13 is configured to irradiate light from the light sources 14 according to user's manipulation of the illumination manipulation part 63 (see FIG. 4). In this embodiment, the light irradiation device 13 is configured to light the light sources 14 on all or some of the surface parts 21 to 24. The light irradiation device 13 is also configured to light only white or warm-colored LEDs of the light sources 14, according to user's manipulation of the illumination manipulation part 63. The light irradiation device 13 may be configured to selectively exhibit a white color, a warm color, and an intermediate color between the white color and the warm color in response to the user's manipulation. The white color may be made by lighting all of the white LEDs. The warm color may be made by lightning all of the warm-colored LEDs. The intermediate color may be made by lightning both the white LEDs and the warm-colored LEDs. At this time, by reducing the illuminance of the white LEDs and the warm-colored LEDs to half of the its original illuminance, the intermediate color may be made to have substantially the same illuminance as the white color and the warm color. Or alternatively, the intermediate color may be made to have substantially the same illuminance as the white color and the warm color by lighting half of the all warm-colored LEDs and half of the all white LEDs while leaving the illuminance of the LEDs unchanged.

The antenna parts 31 to 34 have a function as an antenna for receiving radio broadcasting (radio broadcasting waves). The antenna parts 31 to 34 are formed of generally rod-like metal. An upper end 35 (first end) of each of the antenna parts 31 to 34 is connected to a second housing 53 that is arranged above the lantern part 10, and a lower end 36 (second end) of each of the antenna parts 31 to 34 is connected to the first housing 71 that is arranged below the lantern part 10. A portion between the upper end 35 and the lower end 36 of each of the antenna parts 31 to 34 partially extends in the axial direction (the up-down direction) and is spaced apart from the lantern part 10 in a direction orthogonal to the axis AX (see FIG. 2). In other words, each of the antenna parts 31 to 34 has a portion that is disposed between the upper end 35 and the lower end 36 and that extends substantially parallel to the axis AX. In this embodiment, the portion between the upper end 35 and the lower end 36 of each of the antenna parts 31 to 34 is spaced apart from an outer peripheral surface of the lantern part 10 (the cover 11) radially outside of the lantern part 10. The antenna parts 31 to 34 and the cover 11 are spaced apart from each other in the radial direction by a distance sufficient for a user to insert fingers between the antenna parts 31 to 34 and the cover 11 such that the user can hold any one of the antenna parts 31 to 34.

In this embodiment, the antenna parts 31 to 34 are arranged at positions that do not overlap with the light sources 14 when viewed in a radially outward direction from the axis AX of the lantern part 10. In other words, the antenna part 31 is arranged such that a straight line L, which is orthogonal to the axis AX and which extends through (intersects) the antenna part 31, does not extend through (intersect) the light sources 14. Similarly, the antenna part 32 is arranged such that another straight line L, which is orthogonal to the axis AX and which extends through (intersects) the antenna part 32, does not extend through (intersect) the light sources 14. The same relationship applies to the antenna part 33 and 34. Thus, as shown in FIG. 9, in a cross section, orthogonal to the axis AX, of the lantern part 10 and the antenna parts 31 to 34, the light sources 14 are arranged at positions other than on (offset from) the straight lines L intersecting the axis AX and the antenna parts 31 to 34. In this embodiment, in this cross section, the antenna part 31 is arranged on (intersected by) a line connecting the axis AX and the connecting surface part 25. In other words, the straight line L extending through the axis AX and the antenna part 31 extends through the connecting surface part 25. Similarly, the antenna part 32 is arranged on a line connecting the axis AX and the connecting surface part 26; the antenna part 33 is arranged on a line connecting the axis AX and the connecting surface part 27; the antenna part 34 is arranged on a line connecting the axis AX and the connecting surface part 28. In other words, the straight line L extending through the axis AX and the antennas 32 to 34 extends through the connecting surface parts 26 to 28, respectively. Such arrangement can reduce the possibility that light irradiated from the light irradiation device 13 is intercepted (blocked) by the antenna parts 31 to 34.

The audio output part 50 is configured to output sound toward the surroundings of the audio output device 1. In this embodiment, the audio output part 50 is housed within the second housing 53 arranged on the upper side of the lantern part 10. More specifically, the audio output part 50 is housed within a space defined by the upper wall of the cover 11 and the second housing 53. The audio output part 50 outputs sound toward the surroundings of the audio output device 1 by control of the control part 70. As shown in FIG. 10, the audio output part 50 has known components suitable for outputting sound, including a speaker corn 51 and a sound reflector 52.

The second housing 53 has a side wall (peripheral wall) 54 extending in the axial direction and an upper wall 55 connected to an upper end of the side wall 54 and substantially orthogonal to the side wall 54. The second housing 53 can be formed, for example, of synthetic resin or metal. The flashlight part 80 is provided in the central portion of the upper wall 55. A lower end of the side wall 54 is connected to an upper end of the lantern part 10. A plurality of through holes 57 are formed through the side wall 54 in the radial direction. The audio output part 50 outputs sound to the surroundings via the through holes 57.

As shown in FIGS. 3 and 6, the second housing 53 has insertion parts 58, 59 for insertion of a string member 110. The insertion parts 58, 59 are respectively formed on front and rear parts of the side wall 54 of the second housing 53. User can insert the string member 110 through the insertion parts 58, 59 and hang the string member 110 from a hook or the like when using the audio output device 1.

As shown in FIG. 11, the handle 84 is connected to the second housing 53. The handle 84 is configured to be used by a user to hold the audio output device 1 or hang it from a hook or the like. In this embodiment, the handle 84 has an arm 85 and an arm cover 86. First and second end parts of the arm 85 are respectively connected to the front and rear parts of the side wall 54 of the second housing 53. The arm cover 86 covers a substantially central part between the first and second end parts of the arm 85. The arm cover 86 can be formed, for example, of synthetic resin such as rubber.

The handle 84 is turnable relative to the second housing 53. A pivot of the handle 84 extends in the front-rear direction. The handle 84 is turned from a stored position to an upright position and from the upright position to the stored position. In the stored position, as shown in FIG. 2, the handle 84 is located outside of the side wall 54 of the second housing 53. In the upright position, as shown in FIG. 11, the handle 84 is turned away from the side wall 54 and extends substantially in the front-rear direction. In this embodiment, a notch 87 suitable for hanging the handle 84 from a hook is formed in the arm cover 86 at a position corresponding to a highest part of the handle 84 located in the upright position.

The flashlight part 80 is configured to irradiate light mainly in the axial direction. The flashlight part 80 is arranged on (on the upper side of) the audio output part 50. As shown in FIG. 10, the flashlight part 80 has known components suitable for illuminating in a prescribed direction, including a light source 81, a collimator lens 82 arranged on the light source 81 and a transparent lens 83 arranged on the collimator lens 82. In this embodiment, the light source 81 is an LED. The flashlight part 80 irradiates light from the light source 81 in the axial direction (upward in the attitude shown in FIG. 2) when the illumination manipulation part 63 is operated.

The first housing 71 is configured to house the control part 70. The first housing 71 can be formed, for example, of synthetic resin. The first housing 71 is arranged on the lower side of the lantern part 10. The first housing 71 has a generally cylindrical appearance extending along the axial direction. The size of the first housing 71 in the radial direction is substantially equal to the size of the cover 11 in the radial direction. The first housing 71 may be formed of metal or a combination of synthetic resin and metal.

In this embodiment, the first housing 71 is sized such that a user can hold the outer periphery (outer peripheral surface) of the first housing 71. Thus, the user can grip and hold the first housing 71 from a direction crossing the axial direction. The user can use the flashlight part 80 to illuminate in a desired direction by holding the first housing 71 such that the axial direction of the audio output device 1 corresponds to the desired direction, for example, as shown in FIG. 12.

In this embodiment, the first housing 71 has an insertion part 72 for insertion of the string member 110 (see FIG. 3).

The insertion part 72 is provided substantially in the same position as the insertion part 59 of the second housing 53 in the circumferential direction. User can insert the string member 110 through the insertion part 72 of the first housing 71 and the insertion part 59 of the second housing 53 and hang the string member 110 from a hook or the like when using the audio output device 1. Thus, the user can also hang the audio output device 1 such that the axial direction of the audio output device 1 corresponds to a direction crossing the vertical direction as shown in FIG. 12.

The audio manipulation part 62, the illumination manipulation part 63, the display part 61, the invalidation switch 64 and the USB terminal part 40 are now described. In this embodiment, the audio manipulation part 62, the illumination manipulation part 63, the display part 61, the invalidation switch 64 and the USB terminal part 40 are arranged on the outer periphery of the first housing 71. More specifically, the audio manipulation part 62, the display part 6 and the invalidation switch 64 are arranged below connections between the lower ends 36 of the antenna parts 31 to 34 and the first housing 71 on the outer peripheral surface of the first housing 71. As shown in FIG. 4, the illumination manipulation part 63 is arranged between the connection of the lower end 36 of the antenna part 31 and the first housing 71 and the connection of the lower end 36 of the antenna part 32 and the first housing 71.

The audio manipulation part 62 is an input interface (e.g., a pushbutton) mainly for receiving user's instruction (manipulation) relating to audio output. The audio manipulation part 62 is configured to be manually operated by the user to receive user's manipulation such as selection of AM/FM radio broadcasts, selection of the frequency, and volume control. The audio manipulation part 62 transmits to the control part 70 data relating to the received audio manipulation.

The illumination manipulation part 63 is an input interface (e.g., a pushbutton) for receiving user's instruction (manipulation) relating to irradiation of light. The illumination manipulation part 63 is configured to be manually operated by the user to receive user's manipulation such as on/off switching of the lantern part 10, color toning of the lantern part 10 and on/off switching of the flashlight part 80.

The display part 61 is an output interface for displaying drive information of the audio output device 1. The drive information includes a currently selected radio broadcast, frequency and volume, and so on. In this embodiment, the display part 61 is configured as a liquid crystal display having a backlight.

The invalidation switch 64 (e.g., a pushbutton switch) is configured to be manually operated by the user, and to invalidate user's manipulation of the audio manipulation part 62 when turned on. The invalidation switch 64 is configured to be switched on and off, for example, when pressed for a predetermined time or longer. In this embodiment, the audio manipulation part 62 is configured not to transmit to the control part 70 data relating to user's audio manipulation when the invalidation switch 64 is turned on.

The USB terminal part 40 is configured to connect and supply power to an external device having a USB terminal. Specifically, the USB terminal part 40 is configured at least either to charge the external device, or to drive the external device, by using power of the battery pack 100. In this embodiment, a switch 41 is further provided on the first housing 71 to turn on and off power supply to the external device. In this embodiment, the audio output device 1 has a constant current circuit for receiving power supply from an external power source, and a voltage conversion circuit for supplying power to the external device connected to the USB terminal part 40. The audio output device 1 charges a secondary battery of the external device with power from the external power source, or drives the external device by using power from the external power source, when the external device is connected to the USB terminal part 40 and the switch 41 is turned on. The external device includes a portable terminal such as a smart phone.

The battery pack 100 to be removably coupled to the mounting unit 90 (see FIG. 7), and the mounting unit 90 are now described. In this embodiment, the mounting unit 90 is provided on the lower side of the first housing 71.

The battery pack 100 can be removably coupled to (mounted on) the mounting unit 90. The battery pack 100 can be used as an external power source for the audio output device 1.

The battery pack 100 may also be called as a battery package or an assembled battery, and has an outer shell housing formed into a prescribed size and a plurality of lithium ion battery cells that are housed in the outer shell housing and connected in series. The battery pack 100 is a rechargeable battery pack and can be recharged by a charger (not shown) after used as an external power source. The battery pack 100 is a so-called slide-type battery pack and can be removably coupled to (mounted on) the mounting unit 90 or a charger.

In FIG. 13, where the axial direction is defined as the up-down direction, the up-down direction, the front-rear direction and the left-right direction are shown with reference to the attitude of the battery pack 100 mounted on the mounting unit 90. The battery pack 100 has a pair of left and right rail receiving parts 101. A positive output terminal 102 and a negative output terminal 103 are arranged between the rail receiving parts 101. A connector part 104 is arranged between the positive output terminal 102 and the negative output terminal 103 and configured to transmit and receive control signals to and from a charger and other devices. A lock member 105 is provided on an upper part of the battery pack 100. A spring member (not shown) is arranged below the lock member 105 within the housing of the battery pack 100. The spring member biases the lock member 105 to press the lock member 105 upward. An unlock button 106 (see, for example, FIG. 2) is arranged on a front surface of the battery pack 100. When the unlock button 106 is pressed downward, the lock member 105 moves rearward.

A mounting part 91 is arranged on the mounting unit 90. The mounting part 91 has a pair of slide rails 92. In this embodiment, the slide rails 92 extend in the front-rear direction. A positive input terminal 93 and a negative input terminal 94 are arranged on the slide rails 92. The mounting part 91 further has a lock receiving hole (not shown) that is engageable with the lock member 105 of the battery pack 100.

The rail receiving parts 101 are engaged with the slide rails 92 and the battery pack 100 is mounted onto the mounting part 91 by sliding the battery pack 100 in a mounting direction relative to the mounting part 91. In this embodiment, the mounting direction is from front to rear. When the battery pack 100 is mounted onto the mounting part 91, the positive input terminal 93 and the negative input terminal 94 of the mounting part 91 are electrically connected to the positive output terminal 102 and the negative output terminal 103 of the battery pack 100. Further, when the battery pack 100 is mounted onto the mounting part 91, the lock member 105 is engaged with the lock receiving hole and the battery pack 100 is fixed and locked unmovably in the front-rear direction.

When a user presses down the unlock button 106 of the battery pack 100 mounted onto the mounting part 91, the lock member 105 is disengaged (unlocked) from the lock receiving hole. When the battery pack 100 is slid in a removing direction relative to the mounting part 91 in the unlocked state, the battery pack 100 is removed from the mounting part 91. In this embodiment, the removing direction is from rear to front. Thus, the battery pack 100 can be removably mounted onto the mounting part 91 of the mounting unit 90.

The control part 70 is now described with reference to FIG. 1. The control part 70 is configured to control light irradiation and audio output in the audio output device 1. The control part 70 has a receiving part 73, a communication part 74, an audio control part 75, an illumination control part 76 and a main control part 77.

The receiving part 73 serves as a tuner. The receiving part 73 is configured to be tuned to a radio broadcasting wave obtained via the antenna parts 31 to 34 and generate audio data. The receiving part 73 is capable of generating audio data corresponding to AM radio broadcasting waves and audio data corresponding to FM radio broadcasting waves.

The communication part 74 is configured to obtain audio data from an external device by radio communication. The external device includes a portable terminal such as a smart phone. The communication part 74 is configured to obtain audio data transmitted from the external device, based on radio communication standards for BL (Bluetooth; registered trademark), BLE (Bluetooth Low Energy) and the like.

The audio control part 75 is configured to process the audio data generated by the receiving part 73. The audio data processing includes sound volume adjustment processing and sound quality adjustment processing. The sound quality adjustment processing includes adjustment of frequency characteristic of sound. The audio control part 75 amplifies the processed audio data and outputs it to the audio output part 50. The audio control part 75 outputs from the audio output part 50 sound corresponding to an AM radio wave and sound corresponding to an FM radio wave. The audio control part 75 is further configured to be output from the audio output part 50 data corresponding to the audio data obtained by the communication part 74.

The illumination control part 76 is configured to obtain the data of the illumination manipulation part 63. In this embodiment, the illumination control part 76 is configured to control on/off switching of the lantern part 10 and color toning of the lantern part 10, based on the obtained data. For example, the illumination control part 76 controls the light sources 14 of the light irradiation device 13 to light either one or both of the white LEDs and the warm-colored LEDs, or to change the illuminance of these LEDs, according to user's manipulation of the illumination manipulation part 63. Further, the illumination control part 76 is configured to increase or decrease the number of the surface parts 21 to 24 on which the light sources 14 are to be lit.

The main control part 77 is capable of displaying drive information of the audio output device 1 on the display part 61. In this embodiment, the main control part 77 generates drive information based on the data generated by the audio manipulation part 62 and displays it on the display part 61.

The main control part 77 is configured to obtain the residual capacity of the battery pack 100 mounted on the mounting unit 90 and to flicker the backlight of the display part 61 when the obtained residual capacity is equal to or less than a predetermined residual capacity stored in a memory or the like. The main control part 77 may be configured to flicker the backlight of the display part 61 when the obtained residual capacity is equal to or less than a predetermined first capacity and equal to or more than a predetermined second capacity smaller than the first capacity. In this case, when the obtained residual capacity is less than the second capacity, the main control part 77 may stop flickering of the backlight and display on the display part 61 information indicating that the power source is turned off soon.

The main control part 77 is configured not to output from the audio output part 50 sound corresponding to an AM radio wave when an external device is connected to the USB terminal part 40 and power is supplied to the external device from the battery pack 100. In this embodiment, the main control part 77 is configured to obtain information indicating that an external device is connected to the USB terminal part 40 and that the switch 41 is turned on. When obtaining this information, the main control part 77 controls the audio control part 75 not to output sound corresponding to an AM radio wave.

<Effects>

According to the above-described first embodiment, the audio output device 1 has the following effects.

(E1) The audio output device 1 has the elongate lantern part 10 extending in the axial direction and configured to irradiate light radially outward, the antenna parts 31 to 34 configured to receive radio broadcasting waves, the audio output part 50 configured to output sound, and the control part 70 configured to control light irradiation from the lantern part 10 and audio output from the audio output part 50. The upper end 35 (first end) and the lower end 36 (second end) of each of the antenna parts 31 to 34 are respectively connected to the upper side (first side) and the lower side (second side) relative to the central part of the lantern part 10 in the axial direction (up-down direction). The antenna parts 31 to 34 each includes a portion that is disposed between the upper end 35 and the lower end 36 of each of the antenna parts 31 to 34 and that extends in the axial direction and is spaced apart from the lantern part 10 radially outside of the lantern part 10. This structure provides the antenna parts 31 to 34 with a function of protecting the lantern part 10 against external impact in addition to the function as an antenna for receiving radio broadcasting waves.

(E2) The antenna parts 31 to 34 and the cover 11 are spaced apart from each other by a distance sufficient for a user to insert fingers between the antenna parts 31 to 34 and the cover 11 and hold any one of the antenna parts 31 to 34. This structure provides the antenna parts 31 to 34 with a function as a grip part to be used to hold the audio output device 1.

(E3) The upper and lower ends 35, 36 of each of the antenna parts 31 to 34 are respectively connected to the upper and lower sides relative to the central part of the lantern part 10 in the axial direction. This structure can reduce the possibility of breakage of the antenna parts 31 to 34, as compared with a structure in which one of the upper and lower ends 35, 36 of each of the antenna parts 31 to 34 is not connected (fixed).

(E4) The audio output device 1 has a plurality of the antenna parts 31 to 34. This structure improves reception sensitivity of radio broadcasting waves, as compared with a structure having only one antenna. Further, the upper and lower ends 35, 36 of each of the antenna parts 31 to 34 are respectively connected to the upper and lower sides relative to the central part of the lantern part 10 in the axial direction, and the portion between the upper end 35 and the lower end 36 of each of the antenna parts 31 to 34 extends in the axial direction (the up-down direction) and is spaced apart from the lantern part 10 radially outside of the lantern part 10. Thus, the audio output device 1 is excellent in design while having a plurality of members (the antenna parts 31 to 34) having a function as an antenna.

(E5) The audio output part 50 is arranged above the lantern part 10, and the control part 70 is arranged below the lantern part 10. Thus, in the audio output device 1, the control part 70, the lantern part 10 and the audio output part 50 are arranged in this order from the bottom. With this arrangement, sound can be carried better to the surroundings than with a structure in which the audio output part 50 is arranged below the control part 70 and the lantern part 10.

(E6) The audio output device 1 has the flashlight part 80 arranged on the upper side of the audio output part 50. Thus, the audio output device 1 is capable of illuminating the axial direction with the flashlight part 80 in addition to illuminating in a direction of the lantern part 10 crossing the axial direction with the lantern part 10.

(E7) The lantern part 10 has the tubular (hollow cylindrical) cover 11 extending in the axial direction and formed to transmit light, and the light irradiation device 13 arranged inside of the cover 11 and having the light sources 14. Thus, the light irradiation device 13 can be protected with the cover 11.

(E8) The antenna part 31 are arranged such that a straight line L orthogonal to the axis AX and intersecting the axis AX and the antenna part 31 does not extend through (intersect) the light sources 14. In other words, the light sources 14 are not arranged in a straight line L orthogonal to the axis AX and connecting the axis AX to the antenna part 31. The same relationship applies to the antenna parts 32 to 34. This arrangement can reduce the possibility that light irradiated from the lantern part 10 is intercepted (blocked) by the antenna parts 31 to 34, while the antenna parts 31 to 34 provide a function of protecting the lantern part 10.

(E9) The audio output device 1 has the USB terminal part 40 that is configured at least either to charge an external device with power of the battery pack 100 or to drive the external device by power from the battery pack 100. Thus, a user can use the audio output device 1 to charge or use an external device, so that the audio output device 1 is useful, for example, in camping or during a disaster.

(E10) The control part 70 is configured not to output from the audio output part 50 sound corresponding to an AM radio wave when the external device is connected to the USB terminal part 40. Thus, noise that may be caused by simultaneously using the USB terminal part 40 and an AM radio is not outputted from the audio output part 50, so that the audio output device 1 is improved in usability (ease of use).

(E11) The audio output device 1 has the first housing 71 that is configured to house the control part 70 and configured such that a user can hold the outer periphery (outer peripheral surface) of the first housing 71. Thus, the first housing 71 can be used as a grip part when the flashlight part 80 is used. Accordingly, it is not necessary to separately provide a grip part for the flashlight part 80, so that the audio output device 1 is improved in design.

(E12) The audio output device 1 has the audio manipulation part 62 that is provided on the outer periphery (outer peripheral surface) of the first housing 71 for user's manipulation of the output of the audio output part 50, and the invalidation switch 64 configured to invalidate user's manipulation of the audio manipulation part 62. Thus, the possibility that the user accidentally manipulates the audio manipulation part 62 when holding the outer periphery of the first housing 71 can be reduced by turning on the invalidation switch 64.

(E13) The audio output device 1 has the mounting unit 90 configured such that the battery pack 100 can be removably coupled thereto and the display part 61 configured to display drive information of the audio output device 1 and having a backlight. The control part 70 is configured to flicker the backlight of the display part 61 when the residual capacity of the battery pack 100 mounted on the mounting unit 90 is not more than a predetermined capacity. This indicates to the user that the residual capacity of the battery pack 100 is not more than the predetermined capacity.

(E14) The lantern part 10 is arranged above the control part 70, and the mounting unit 90 is arranged below the control part 70. Thus, when the battery pack 100 is mounted on the mounting unit 90, the battery pack 100, the mounting unit 90, the control part 70 and the lantern part 10 are arranged in this order from the bottom to top. Thus, the relatively heavy battery pack 100 is arranged on the bottom, so that the audio output device 1 is improved in stability when placed on a ground, floor or table.

(E15) The audio output device 1 has the second housing 53 for housing the audio output part 50, and the handle 84 connected to the second housing 53 to extend upward from the second housing 53. Thus, a user can hold the handle 84 to carry the audio output device 1, or hang the handle 84 from a hook or the like to fix the audio output device 1.

Second Embodiment

An audio output device 1a according to a second embodiment is now described with reference to FIG. 14. In the following description, components identical to those of the above-described embodiment are given the same numerals and not described.

In this embodiment, when an external device is connected to the USB terminal part 40 while sound corresponding to an AM radio wave is outputted, a control part 70a performs the following control. Specifically, a main control part 77a controls an audio control part 75a to output from the audio output part 50 sound corresponding to an FM radio wave instead of sound corresponding to an AM radio wave. The main control part 77a may output sound corresponding to a previously selected FM radio frequency or sound corresponding to a predetermined frequency, as the sound corresponding to an FM radio wave.

<Effects>

According to this embodiment, when an external device is connected to the USB terminal part 40 while sound corresponding to an AM radio wave is outputted, the control part 70a (the main control part 77a) switches the output of the audio output part 50 to an FM radio (sound corresponding to an FM radio wave). Thus, the output of the radio is continued while reducing noise, so that the usability (ease of use) is further improved. In other than the point described above, the audio output device 1a has the same structure as the audio output device 1 according to the first embodiment, and thus has the same effects (E1) to (E15) as the first embodiment.

Third Embodiment

An audio output device 1b according to a third embodiment is now described with reference to FIG. 15. Like in the above-described embodiments, a lantern part 10b is arranged adjacent to the second housing 53 in the axial direction. In this embodiment, the inside (internal space) of a cover 11*b* communicates with the inside (internal space) of the second housing 53. Specifically, a through hole 12*b* is formed through an upper wall of the cover 11*b* of the lantern part 10*b* in the axial direction. The inside of the cover 11*b* communicates with the inside of the second housing 53 via the through hole 12*b*.

<Effects>

According to this embodiment, sound outputted from the audio output part 50 is resonated inside the cover 11*b*. Thus, the cover 11*b* provides a function of resonating sound outputted from the audio output part 50 in addition to the function of protecting the light irradiation device 13. In other than the point described above, the audio output device 1*b* has the same structure as the audio output device 1 according to the first embodiment, and thus has the same effects (E1) to (E15) as the first embodiment.

Fourth Embodiment

An audio output device 1*c* according to a fourth embodiment is now described with reference to FIG. 16. In this embodiment, protection members 31*c*, 32*c*, 33*c*, 34*c* are arranged radially outside of the lantern part 10. The protection members 31*c*, 32*c*, 33*c*, 34*c* are different from the antenna parts 31 to 34 of the above-described embodiments in that they do not have a function as an antenna for the audio output device 1*c*, but otherwise identical to the antenna parts 31 to 34. In this embodiment, an antenna for receiving radio broadcasting waves is housed within the first housing 71.

<Effects>

According to this embodiment, the protection members 31*c* to 34*c* protect the lantern part 10 against external impact. In other than the point described above, the audio output device 1*c* has the same structure as the audio output device 1 according to the first embodiment, and thus has the same effects (E1) to (E15) as the first embodiment.

<Correspondences>

Correspondences between the features of the above-described embodiments and the features of the present disclosure are as follows.

The battery pack 100 is an example of the "external power source". The audio output devices 1, 1*a*, 1*b*, 1*c* are examples of the "audio output device". The antenna parts 31 to 34 are examples of the "antenna part". The axis AX is an example of the "first axis". The axial direction, the up-side direction are examples of the "first direction". The upper end 35 of each of the antenna parts 31 to 34 is an example of the "first end of the antenna part". The lower end 36 of each of the antenna parts 31 to 34 is an example of the "second end of the antenna part". The lantern parts 10, 10*b* are examples of the "lantern part". The upper side of the lantern part 10 is an example of the "first side relative to a central part of the lantern part in a first direction parallel to the first axis". The lower side of the lantern part 10 is an example of the "second side relative to the central part of the lantern part in a first direction parallel to the first axis". The audio output part 50 is an example of the "audio output part". The control part 70, 70*a*, the audio control part 75, 75*a*, the illumination control part 76 and the main control part 77, 77*a* are examples of the "control part". The flashlight part 80 is an example of the "flashlight part". The light irradiation device 13 is an example of the "light irradiation device". The light source 14 is an example of the "light source". The straight line L is an example of the "straight line". The USB terminal part 40 is an example of the "USB terminal part". The first housing 71 is an example of the "first housing". The audio manipulation part 62 is an example of the "manipulation part". The invalidation switch 64 is an example of the "switch". The mounting unit 90 is an example of the "mounting unit". The display part 61 is an example of the "display part". The second housing 53 is an example of the "second housing". The handle 84 is an example of the "handle". The protection members 31*c* to 34*c* are an example of the "protection member". The cover 11, 11*b* are examples of the "cover part".

Other Embodiments

The antenna parts 31 to 34 and the protection members 31*c* to 34*c* may have different shapes from the above-described embodiments, insofar as the first end (upper end 35) and the second (lower end 36) of each of the antenna parts 31 to 34 and the protection members 31*c* to 34*c* are respectively connected to the first side (upper side) and the second side (lower side) relative to the central part of the lantern part 10, 10*b* in the axial direction, and insofar as the portion between the upper end 35 and the lower end 36 of each of the antenna parts 31 to 34 and the protection members 31*c* to 34*c* is spaced apart from the lantern part 10, 10*b* in a direction orthogonal to the axis AX. Further, the shape and number of the antenna parts 31 to 34 and the protection members 31*c* to 34*c* are not limited to those in the above-described embodiments.

The upper end 35 of each of the antenna parts 31 to 34 and the protection members 31*c* to 34*c* may be connected not to the second housing 53, but to an upper end part of the cover 11, 11*b*. For example, where the axial direction is defined as the up-down direction, the "first side relative to the central part of the lantern part in a first direction parallel to the first axis" may include not only a region above the lantern part 10, 10*b* but a part on the upper side of the central part of the lantern part 10, 10*b*. The lower end 36 of each of the antenna parts 31 to 34 and the protection members 31*c* to 34*c* may be connected not to the first housing 71, but to a lower end part of the cover 11, 11*b*. Thus, the "second side relative to the central part of the lantern part in a first direction parallel to the first axis" may include not only a region below the lantern part 10, 10*b* but a part on the lower side of the central part of the lantern part 10, 10*b*.

The antenna parts 31 to 34 and the protection members 31*c* to 34*c* may be arranged to face the light sources 14 in cross section crossing the axial direction. The lantern part 10 need not have the cover 11. The lantern part 10, 10*b* may be formed by light sources being arranged on a tubular (cylindrical) base part, or formed as an illumination device such as a straight tube fluorescent lamp extending in the axial direction.

The control part 70, 70*a* need not have a plurality of function parts as shown in FIGS. 1 and 14. For example, a control substrate for performing the function of the illumination control part 76 may be housed within the second housing 53. In the above-described embodiments, the control part 70, 70*a* may be configured as a computer having at least one processor and a memory. The control part 70, 70*a* may perform the above-described various functions by executing programs or commands read into the memory by the processor. Alternatively, the control part 70, 70*a* may be configured to perform the functions by a hardware circuit.

The display part 61, the audio manipulation part 62, the illumination manipulation part 63 and the invalidation switch 64 need not be arranged on the first housing 71. For example, the illumination manipulation part 63 and the invalidation switch 64 may be arranged on the upper wall 55 of the second housing 53.

The arrangement positions of the audio output part 50, the lantern part 10 and the flashlight part 80 are not limited to those of the above-described embodiments. For example, the audio output part 50 may be arranged under the lantern part 10 or between the control part 70 and the lantern part 10.

In the above-described fourth embodiment, the audio output device 1c need not have an antenna. The audio control part 75 may output to the audio output part 50 data corresponding to the audio data obtained from the communication part 74.

The present disclosure is not limited to the above-described embodiments, but can be implemented in various structures without departing from the scope of the disclosure. For example, the technical features in the embodiments that correspond to the technical features in the aspects described in "Summary" herein can be appropriately replaced or combined in order to solve at least one of the above-described problems or to achieve at least one of the above-described effects. Further, at least one of the technical features can be appropriately omitted unless described as being essential in this specification.

DESCRIPTION OF THE REFERENCE NUMERALS

1, 1a, 1b, 1c . . . audio output device, 10, 10b . . . lantern part, 11, 11b . . . cover, 12b through hole, 13 . . . light irradiation device, 14 . . . light source, 20 . . . base part, 21 . . . front surface part, 22 . . . left surface part, 23 . . . rear surface part, 24 . . . right surface part, 25, 26, 27, 28 . . . connecting surface part, 31, 32, 33, 34 . . . antenna part, 35 . . . first end, 36 . . . second end 31c, 32c, 33c, 34c . . . protection member, 40 . . . USB terminal part, 41 . . . switch, 50 . . . audio output part, 51 . . . speaker corn, 52 . . . sound reflector, 53 . . . second housing, 54 . . . side wall, 55 . . . upper wall, 57 . . . through hole, 58, 59 . . . insertion part, 61 . . . display part, 62 . . . audio manipulation part, 63 . . . illumination manipulation part, 64 . . . invalidation switch, 70, 70a . . . control part, 71 . . . first housing, 72 . . . insertion part, 73 . . . receiving part, 74 . . . communication part, 75, 75a . . . audio control part, 76 . . . illumination control part, 77, 77a . . . main control part, 80 . . . flashlight part, 81 . . . light source, 82 . . . collimator lens, 83 . . . transparent lens, 84 . . . handle, 85 . . . arm, 86 . . . arm cover, 90 . . . mounting unit, 91 . . . mounting part, 92 . . . slide rail, 93 . . . positive input terminal, 94 . . . negative input terminal, 100 . . . battery pack, 101 . . . rail receiving part, 102 . . . positive output terminal, 103 . . . negative output terminal, 104 . . . connector part, 105 . . . lock member, 106 . . . unlock button, 110 . . . string member, AX . . . axis

The invention claimed is:

1. An audio output device, which is driven by power supplied from an external power source, comprising:
a lantern part that extends along a first axis and that is configured to irradiate light in a direction crossing the first axis;
an antenna part configured to receive radio broadcasting waves, the antenna part having a first end and a second end that are respectively connected to a first side and a second side relative to a central part of the lantern part in a first direction parallel to the first axis, the antenna part having a portion being disposed between the first end and the second end, extending in the first direction and spaced apart from the lantern part in a direction orthogonal to the first axis;
an audio output part configured to output sound; and
a control part configured to control light irradiation from the lantern part and audio output from the audio output part, the control part being configured to cause the audio output part to output sound corresponding to a radio broadcasting wave received by the antenna part.

2. The audio output device as defined in claim 1, wherein:
the first direction defines an up-down direction of the audio output device,
the audio output part is arranged above the lantern part, and
the control part is arranged below the lantern part.

3. The audio output device as defined in claim 2, further comprising a flashlight part arranged above the audio output part.

4. The audio output device as defined in claim 3, further comprising:
a first housing configured to house the control part and configured such that a user can hold an outer periphery of the first housing;
a manipulation part provided on the outer periphery of the first housing and configured to be manually operated by the user for setting the output of the audio output part; and
a switch configured to invalidate the output set by the user via the manipulation part.

5. The audio output device as defined in claim 2, further comprising:
a second housing configured to house the audio output part; and
a handle connected to the second housing to extend upward from the second housing.

6. The audio output device as defined in claim 1, further comprising:
a second housing configured to house the audio output part;
wherein:
the lantern part has a light source and a tubular cover part that extends in the first direction and within which the light source is housed, and
the cover part is arranged adjacent to the second housing in the first direction, and an internal space of the cover part communicates with an internal space of the second housing.

7. The audio output device as defined in claim 1, wherein:
the lantern part has a light irradiation device having a plurality of light sources, and
the antenna part is arranged such that a straight line orthogonal to the first axis and intersecting the antenna part does not extend through the light sources.

8. The audio output device as defined in claim 1, further comprising a USB (universal serial bus) terminal part that is connectable with an external device and configured at least either (i) to charge the external device with power of the external power source, or (ii) to drive the external device by using power of the external power source.

9. The audio output device as defined in claim 8, wherein:
the control part is configured:
to selectively output from the audio output part sound corresponding to an AM (amplitude modulation) radio wave, and
not to output from the audio output part sound corresponding to the AM radio wave when the external device is connected to the USB terminal part.

10. The audio output device as defined in claim 9, wherein:
the control part is configured:
to selectively output from the audio output part sound corresponding to the AM radio wave and sound corresponding to an FM (frequency modulation) radio wave, and
to output from the audio output part sound corresponding to the FM radio wave instead of sound corresponding to the AM radio wave when the external device is connected to the USB terminal part while the sound corresponding to the AM radio wave is outputted.

11. The audio output device as defined in claim 1, further comprising:
a mounting unit configured such that a battery pack as the external power source can be removably coupled thereto; and
a display part configured to display drive information of the audio output device and having a backlight;
wherein:
the control part is configured to flicker the backlight of the display part when a residual capacity of the battery pack coupled to the mounting unit is not more than a predetermined capacity.

12. The audio output device as defined in claim 1, further comprising:
a mounting unit configured such that a battery pack as the external power source can be removably coupled thereto;
wherein:
the first direction defines an up-down direction of the audio output device,
the lantern part is arranged above the control part, and
the mounting unit is arranged below the control part.

13. The audio output device as defined in claim 4, further comprising:
a USB (universal serial bus) terminal part that is connectable with an external device and configured at least either (i) to charge the external device with power of the external power source, or (ii) to drive the external device by using power of the external power source,
wherein:
the control part is configured:
to selectively output from the audio output part sound corresponding to an AM (amplitude modulation) radio wave, and
not to output from the audio output part sound corresponding to the AM radio wave when the external device is connected to the USB terminal part.

14. The audio output device as defined in claim 13, wherein:
the control part is configured:
to selectively output from the audio output part sound corresponding to the AM radio wave and sound corresponding to an FM (frequency modulation) radio wave, and
to output from the audio output part sound corresponding to the FM radio wave instead of sound corresponding to the AM radio wave when the external device is connected to the USB terminal part while the sound corresponding to the AM radio wave is outputted.

15. The audio output device as defined in claim 5, wherein:
the lantern part has a light source and a tubular cover part that extends in the first direction and within which the light source is housed, and
the cover part is arranged adjacent to the second housing in the first direction, and an internal space of the cover part communicates with an internal space of the second housing.

16. The audio output device as defined in claim 15, further comprising:
a flashlight part arranged above the audio output part;
a first housing configured to house the control part and configured such that a user can hold an outer periphery of the first housing;
a manipulation part provided on the outer periphery of the first housing and configured to be manually operated by the user for setting the output of the audio output part; and
a switch configured to invalidate the output set by the user via the manipulation part.

17. An audio output device, which is driven by power supplied from an external power source, comprising:
a lantern part that extends along a first axis and that is configured to irradiate light in a direction crossing the first axis;
a protection member configured to protect the lantern part, wherein, a first direction parallel to the first axis defines an up-down direction of the audio output device, the protection member has an upper end and a lower end that are respectively connected to an upper side and a lower side relative to a central part of the lantern part in the up-down direction, the protection member has a portion being disposed between the upper end and the lower end, extending in the up-down direction and spaced apart from the lantern part in a direction orthogonal to the first axis;
an audio output part arranged above the lantern part and configured to output sound;
a control part arranged below the lantern part and configured to control light irradiation from the lantern part and audio output from the audio output part; and
a mounting unit arranged below the control part and configured such that a battery pack for supplying power to the audio output device can be removably coupled thereto.

* * * * *